US010414550B2

(12) United States Patent
Aagaard et al.

(10) Patent No.: US 10,414,550 B2
(45) Date of Patent: Sep. 17, 2019

(54) CLOSURE FOR A PRODUCT-RETAINING CONTAINER

(71) Applicant: Nomacorc LLC, Zebulon, NC (US)

(72) Inventors: Olav Marcus Aagaard, Rotterdam (NL); Damon James Bost, Wake Forest, NC (US); Sandra Davidts, Battice (BE); Malcolm Joseph Thompson, Raleigh, NC (US); Katherine Campbell Glasgow, Wake Forest, NC (US)

(73) Assignee: VINVENTIONS USA, LLC, Zebulon, NC (US)

( * ) Notice: Subject to any disclaimer, the term of this patent is extended or adjusted under 35 U.S.C. 154(b) by 663 days.

(21) Appl. No.: 14/175,266

(22) Filed: Feb. 7, 2014

(65) Prior Publication Data

US 2014/0224759 A1 Aug. 14, 2014

Related U.S. Application Data

(60) Provisional application No. 61/762,569, filed on Feb. 8, 2013.

(51) Int. Cl.
*B32B 1/08* (2006.01)
*B65D 39/00* (2006.01)
(Continued)

(52) U.S. Cl.
CPC ............ *B65D 39/0011* (2013.01); *B32B 1/08* (2013.01); *B32B 3/04* (2013.01); *B32B 25/045* (2013.01);
(Continued)

(58) Field of Classification Search
CPC ............ B65D 39/0058; B65D 39/0011; B32B 25/045; B32B 25/18; B32B 27/04
See application file for complete search history.

(56) References Cited

U.S. PATENT DOCUMENTS

| 3,135,410 A | 1/1964 | Federighi |
| 3,651,841 A | 3/1972 | Ohlsson |

(Continued)

FOREIGN PATENT DOCUMENTS

| AU | 2012224574 A1 | 5/2013 |
| CL | 1950-2002 | 8/2003 |

(Continued)

OTHER PUBLICATIONS

European Patent Examination Report for European Patent Application No. 12787419.6, dated May 27, 2015, 4 pages.
(Continued)

*Primary Examiner* — Jeffrey R Allen
(74) *Attorney, Agent, or Firm* — Withrow & Terranova, P.L.L.C.; Vincent K. Gustafson

(57) ABSTRACT

The disclosure relates to a synthetic closure for a product-retaining container constructed for being inserted and securely retained in a portal-forming neck of said container, said closure comprising at least a core member comprising at least one thermoplastic polymer, and at least one peripheral layer at least partially surrounding and intimately bonded to at least one surface of the core member, said peripheral layer comprising at least one thermoplastic polymer, wherein the synthetic closure is formed by extrusion, and at least one of the core member and the peripheral layer comprises a plurality of cells, and wherein the synthetic closure comprises cork powder.

27 Claims, 1 Drawing Sheet

(51) Int. Cl.
*B32B 25/04* (2006.01)
*B32B 25/18* (2006.01)
*B32B 27/06* (2006.01)
*B32B 27/32* (2006.01)
*B32B 27/36* (2006.01)
*B32B 27/40* (2006.01)
*B32B 3/04* (2006.01)
*B29K 511/02* (2006.01)
*B29L 31/56* (2006.01)
*B29K 105/04* (2006.01)
*B29C 44/04* (2006.01)
*B29C 44/50* (2006.01)

(52) U.S. Cl.
CPC .......... *B32B 25/18* (2013.01); *B32B 27/065* (2013.01); *B32B 27/32* (2013.01); *B32B 27/322* (2013.01); *B32B 27/327* (2013.01); *B32B 27/36* (2013.01); *B32B 27/40* (2013.01); *B65D 39/0058* (2013.01); *B29C 44/0461* (2013.01); *B29C 44/50* (2013.01); *B29K 2105/046* (2013.01); *B29K 2511/02* (2013.01); *B29K 2995/0063* (2013.01); *B29K 2995/0072* (2013.01); *B29L 2031/56* (2013.01); *B32B 2264/065* (2013.01); *B32B 2264/067* (2013.01); *B32B 2266/0221* (2013.01); *B32B 2266/08* (2013.01); *B32B 2270/00* (2013.01); *B32B 2274/00* (2013.01); *B32B 2307/7242* (2013.01); *B32B 2435/00* (2013.01)

(56) References Cited

U.S. PATENT DOCUMENTS

| | | | |
|---|---|---|---|
| 4,134,491 | A | 1/1979 | Turillon et al. |
| 4,150,744 | A | 4/1979 | Fennimore |
| 5,024,130 | A | 6/1991 | Hays, Jr. |
| 5,179,171 | A | 1/1993 | Minami et al. |
| 5,480,915 | A | 1/1996 | Burns |
| 5,501,525 | A | 3/1996 | Cox et al. |
| 5,904,965 | A | 5/1999 | Noel et al. |
| 6,022,816 | A | 2/2000 | Dewar |
| 6,085,923 | A | 7/2000 | Yaniger |
| 6,153,275 | A | 11/2000 | Yaniger |
| 6,221,450 | B1 | 4/2001 | Noel et al. |
| 6,221,451 | B1 | 4/2001 | Lauer et al. |
| 6,355,320 | B1 | 3/2002 | Allman et al. |
| 6,548,598 | B2 * | 4/2003 | Takeuchi ............ C08F 297/02 525/68 |
| 6,613,406 | B1 | 9/2003 | Yaniger |
| 6,651,834 | B2 | 11/2003 | Wong |
| 7,285,315 | B2 | 10/2007 | Fragola |
| 7,314,661 | B2 | 1/2008 | Hueto |
| 7,770,747 | B2 | 8/2010 | Lauer et al. |
| 8,063,163 | B2 | 11/2011 | Hatke et al. |
| 8,092,877 | B2 | 1/2012 | Jester et al. |
| 8,283,394 | B2 | 10/2012 | Pfaadt |
| 2002/0103275 | A1 | 8/2002 | Nogueria de Sousa |
| 2002/0180083 | A1 | 12/2002 | Yaniger |
| 2003/0161985 | A1 | 8/2003 | Lauer |
| 2005/0137073 | A1 | 6/2005 | Weaver |
| 2005/0208244 | A1 | 9/2005 | Delmas |
| 2006/0006132 | A1 | 1/2006 | Lauer et al. |
| 2006/0021487 | A1 | 2/2006 | Dickover et al. |
| 2006/0096468 | A1 | 5/2006 | Paine |
| 2007/0071939 | A1 | 3/2007 | Hueto |
| 2007/0128387 | A1 | 6/2007 | Unwin et al. |
| 2007/0163128 | A1 | 7/2007 | Tarrerias |
| 2007/0203266 | A1 | 8/2007 | Holmes et al. |
| 2008/0000337 | A1 | 1/2008 | Dickover et al. |
| 2008/0229569 | A1 * | 9/2008 | Romao de Sousa ....... B65D 39/0058 29/525 |
| 2008/0300345 | A1 | 12/2008 | Pfaadt |
| 2009/0253818 | A1 | 10/2009 | Kimura et al. |
| 2010/0200606 | A1 | 8/2010 | Davis et al. |
| 2011/0184082 | A1 | 7/2011 | Wright et al. |
| 2011/0290757 | A1 | 12/2011 | Purdy |
| 2012/0021151 | A1 | 1/2012 | Tatarka et al. |
| 2013/0118924 | A1 | 5/2013 | Vidal et al. |
| 2013/0327739 | A1 | 12/2013 | Davidts et al. |
| 2013/0328232 | A1 | 12/2013 | Bost et al. |
| 2014/0141120 | A1 | 5/2014 | Ugliano et al. |
| 2014/0299570 | A1 | 10/2014 | Davidts et al. |
| 2016/0051946 | A1 | 2/2016 | Paetzold |

FOREIGN PATENT DOCUMENTS

| | | |
|---|---|---|
| CN | 1124968 A | 6/1996 |
| CN | 2380584 Y | 5/2000 |
| CN | 1362929 A | 8/2002 |
| CN | 1486266 A | 3/2004 |
| CN | 2380524 Y | 5/2005 |
| CN | 1900405 A | 1/2007 |
| CN | 101203438 A | 6/2008 |
| CN | 101558120 A | 10/2009 |
| CN | 101861274 A | 10/2010 |
| CN | 102361801 A | 2/2012 |
| CN | 102388241 A | 3/2012 |
| CN | 102707022 A | 10/2012 |
| DE | 2928499 A1 | 11/1980 |
| DE | 202009012131 U1 | 3/2010 |
| EP | 1908567 A1 | 4/2008 |
| FR | 2441467 A1 | 6/1980 |
| FR | 2703028 A1 | 9/1994 |
| FR | 2799183 A1 | 4/2001 |
| FR | 2850634 A1 | 8/2004 |
| GB | 1499852 | 3/1975 |
| JP | 2003081297 A | 3/2003 |
| JP | 2006275751 A | 10/2006 |
| WO | 9425513 A1 | 11/1994 |
| WO | 9847783 A1 | 10/1998 |
| WO | 0026103 A1 | 5/2000 |
| WO | 03018304 A1 | 3/2003 |
| WO | 03082700 A1 | 10/2003 |
| WO | 2006094529 A1 | 9/2006 |
| WO | 2007040608 A1 | 4/2007 |
| WO | 2008048129 A1 | 4/2008 |
| WO | 2008063458 A2 | 5/2008 |
| WO | 2009063095 A2 | 5/2009 |
| WO | 2010092046 A1 | 8/2010 |
| WO | 2012120101 A1 | 9/2012 |
| WO | 2012120109 A1 | 9/2012 |

OTHER PUBLICATIONS

Non-Final Office Action for U.S. Appl. No. 13/911,434, dated Jul. 14, 2015, 14 pages.
ASTM Standard D792, "Standard Test Methods for Density and Specific Gravity (Relative Density) of Plastics by Displacement," ASTM International, 2013, 6 pages.
ASTM Standard D1238, "Standard Test Method for Melt Flow Rates of Thermoplastics by Extrusion Plastometer," ASTM International, 2013, 16 pages.
ASTM Standard D1525, "Standard Test Method for Vicat Softening Temperature of Plastics," ASTM International, 2009, 10 pages.
ASTM Standard D1928, , "Standard Practice for Preparation of Compression-Molded Polyethylene Test Sheets and Test Specimens," ASTM International, 1996, 7 pages.
ISO Standard 306, "Plastics—Thermoplastic materials—Determination of Vicat softening temperature (VST)," International Organization for Standardization, 2013, 24 pages.
ISO Standard 527, "Plastics—Determination of tensile properties—Part 1: General principles," International Organization for Standardization, 2012, 28 pages.
ISO Standard 815, "Rubber, vulcanized or thermoplastic—Determination of compression set—Part 1: At ambient or elevated temperatures," International Organization for Standardization, 2014, 18 pages.

(56) References Cited

OTHER PUBLICATIONS

ISO Standard 868, "Plastics and ebonite—Determination of indentation hardness by means of a durometer (Shore hardness)," International Organization for Standardization, 2003, 6 pages.

ISO Standard 1183, "Plastics—Methods for determining the density of non-cellular plastics—Part 1: Immersion method, liquid pyknometer method and titration method," International Organization for Standardization, 2012, 16 pages.

ISO Standard 2030, "Granulated cork—Size analysis by mechanical sieving," International Organization for Standardization, 1990, 4 pages.

Martins, Rui C. et al., "Oxidation Management of White Wines Using Cyclic Voltammetry and Multivariate Process Monitoring," Journal of Agricultural and Food Chemistry, vol. 56, American Chemical Society, Nov. 19, 2008, pp. 12092-12098.

Prieto-Simón, B. et al., "Electrochemical biosensors as a tool for antioxidant capacity assessment," Sensors and Actuators B: Chemical, vol. 129, Issue 1, Elsevier B.V., Jan. 29, 2008, pp. 459-466.

International Preliminary Report on Patentability for International Patent Application No. PCT/EP2013/061433, dated Oct. 21, 2014, 17 pages.

Australian Patent Examination Report for Australian Patent Application No. 2013204654, dated Jan. 21, 2015, 3 pages.

International Preliminary Report on Patentability for International Patent Application No. PCT/US2013/044475, dated Dec. 18, 2014, 9 pages.

Final Office Action for U.S. Appl. No. 13/674,164, dated Mar. 27, 2015, 12 pages.

Canadian Examination Search Report for Canadian Patent Application No. 2,855,255, dated Jan. 27, 2015, 4 pages.

Australian Patent Examination Report for Australian Patent Application No. 2013204648, dated Jan. 22, 2015, 4 pages.

Non-final Office Action for U.S. Appl. No. 13/911,434, dated Jan. 29, 2015, 19 pages.

International Preliminary Report on Patentability for PCT/US2013/071242, dated Jun. 4, 2015, 7 pages.

Non-Final Office Action for U.S. Appl. No. 13/911,477, dated May 12, 2015, 13 pages.

Author Unknown, "Standard Test Method for Oxygen Transmission Rate Through Dry Packages Using a Coulometric Sensor," ASTM Standard F1307-02, ASTM International, 2007, 7 pages.

Avramescu, Alina et al., "Screen-printed biosensors for the control of wine quality based on lactate and acetaldehyde determination," Analytica Chimica Acta, vol. 458, Elsevier Science B.V., Apr. 29, 2002, pp. 203-213.

Caille, Soline et al., "Sensory characteristics changes of red Grenache wines submitted to different oxygen exposures pre and post bottling," Analytica Chimica Acta, vol. 660, Elsevier B.V., Available online Dec. 3, 2009, pp. 35-42.

Crank, John, "The Mathematics of Diffusion (Second Edition)," Clarendon Press, Oxford, 1975, pp. 45-53.

Crochiere, George K., "Measuring oxygen ingress during bottling/storage," Practical Winery and Vineyard Journal, Wine Communications Group, Jan./Feb. 2007, pp. 74-84.

Du Toit, W.J. et al., "Oxygen in Must and Wine: A review," South African Journal of Enology and Viticulture, vol. 27, No. 1, 2006, pp. 76-94.

Barroso, M.F. et al., "Towards a reliable technology for antioxidant capacity and oxidative damage evaluation: Electrochemical (bio)sensors," Biosensors and Bioelectronics, vol. 30, Issue 1, Elsevier B.V., Available online Sep. 3, 2011, pp. 1-12.

Godden, Peter et al., "Wine bottle closures: physical characteristics and effect on composition and sensory properties of a Semillon wine, 1. Performance up to 20 months post-bottling," Australian Journal of Grape and Wine Research, vol. 7, Issue 2, Jul. 2001, pp. 64-1055.

Guan, Wen-Jun et al., "Glucose biosensor based on multi-wall carbon nanotubes and screen printed carbon electrodes," Biosensors and Bioelectronics, vol. 21, Issue 3, Elsevier B.V., Sep. 15, 2005, pp. 508-512.

Liu, Jifeng et al., "Antioxidant Redox Sensors Based on DNA Modified Carbon Screen-Printed Electrodes," Analytical Chemistry, vol. 78, No. 19, American Chemical Society, Oct. 1, 2006, pp. 6879-6884.

Liu, Jifeng et al., "Antioxidant Sensors Based on DNA Modified Electrodes," Analytical Chemistry, vol. 77, No. 23, American Chemical Society, Dec. 1, 2005, pp. 7687-7694.

Lopes, Paulo et al., "Impact of Oxygen Dissolved at Bottling and Transmitted through Closures on the Composition and Sensory Properties of a Sauvignon Blanc Wine during Bottle Storage," Journal of Agricultural and Food Chemistry, vol. 57, No. 21, American Chemical Society, Nov. 11, 2009, pp. 10261-10270.

Lopes, Paulo et al., "Main Routes of Oxygen Ingress through Different Closures into Wine Bottles," Journal of Agricultural and Food Chemistry, vol. 55, No. 13, American Chemical Society, Jun. 27, 2007, pp. 5167-5170.

Lopes, Paulo et al., "Nondestructive Colorimetric Method to Determine the Oxygen Diffusion Rate through Closures Used in Winemaking," Journal of Agricultural and Food Chemistry, vol. 53, No. 18, American Chemical Society, Sep. 7, 2005, pp. 6967-6973.

Lundquist, L. et al., "Oxygen Transmission Rate Measurement Using Oxygen Sensitive Fluorescent Tracers," Presented at the Technical Association of the Pulp and Paper Industry PLACE Division Conference, Aug. 29-Sep. 2, 2004, Indianapolis, Indiana, 13 pages.

Mello, L.D., "Biosensors as a tool for the antioxidant status evaluation," Talanta, vol. 72, Elsevier B.V., Available online Jan. 4, 2007, pp. 335-348.

Pocas, Maria F. et al., "Measurement of Oxygen Transmission Rate through Foamed Materials for Bottle Closures," Packaging Technology and Science, vol. 23, Issue 1, John Wiley & Sons, Ltd., Jan./Feb. 2010, pp. 27-33.

Rabiot, Dominique et al., "Study of the Oxygen Transfer Through Synthetic Corks for Wine Conservation," American Institute of Chemical Engineers, Jan. 1, 1999, 15 pages.

Skouroumounis, George et al., "Oxygen ingress into bottled wine," Practical Winery and Vineyard Journal, Wine Communications Group, Jul./Aug. 2008, pp. 6-14.

Silva Ferreira, Antonio Cesar et al., "Identification of Key Odorants Related to the Typical Aroma of Oxidation-Spoiled White Wines," Journal of Agricultural and Food Chemistry, vol. 51, No. 5, American Chemical Society, Feb. 26, 2003, pp. 1377-1381.

Squarzoni, Margherita et al., "Innovative method for the evaluation of oxygen barrier properties of some different kinds of wine stoppers," Industrie delle Bevande, vol. 33, Apr. 2004, pp. 113-116.

Wirth, J. et al., "The impact of oxygen exposure before and after bottling on the polyphenolic composition of red wines," Food Chemistry, vol. 123, Elsevier Ltd., Nov. 1, 2010, pp. 107-116.

International Search Report and Written Opinion for PCT/US2014/015313 dated May 23, 2014, 10 pages.

International Search Report and Written Opinion for PCT/US2014/033177 dated Jun. 6, 2014, 10 pages.

Non-final Office Action for U.S. Appl. No. 13/674,164 dated Jul. 7, 2014, 11 pages.

Alonso, Angeles et al., "Determination of Antioxidant Power of Red and White Wines by a New Electrochemical Method and Its Correlation with Polyphenolic Content," Journal of Agricultural and Food Chemistry, vol. 50, American Chemical Society, Apr. 30, 2002, pp. 3112-3115.

Celotti, Emilio et al., "The analytical evaluation of wine oxidability," The Australian & New Zealand Grapegrower & Winemaker, Ryan Publications Pty. Ltd., Feb. 2006, pp. 47-52.

Diéval et al., "Measurement of the Oxygen Transmission Rate of Co-extruded Wine Bottle Closures Using a Luminescence-Based Technique", Packaging Technology and Science, vol. 24, Issue 7, John Wiley & Sons, Ltd., Nov. 2011, pp. 375-385.

Kilmartin, Paul et al., "A Cyclic Voltammetry Method Suitable for Characterizing Antioxidant Properties of Wine and Wine Phenolics," Journal of Agricultural and Food Chemistry, vol. 49, American Chemical Society, Mar. 10, 2001, pp. 1957-1965.

International Search Report for PCT/EP2012/072155, dated Feb. 15, 2013, 11 pages.

(56) References Cited

OTHER PUBLICATIONS

International Search Report and Written Opinion for PCT/US13/44475 dated Oct. 10, 2013, 10 pages.
International Search Report and Written Opinion for PCT/US2013/071242 dated Jan. 16, 2014, 11 pages.
Makhotkina, Olga, "Uncovering the influence of antioxidants on polyphenol oxidation in wines using an electrochemical method: Cyclic voltammetry," Journal of Electroanalytical Chemistry, vol. 633, Elsevier B.V., Available online May 27, 2009, pp. 165-174, 2009.
Rodrigues, Astride et al., "Resistance to Oxidation of White Wines Assessed by Voltammetric Means," Journal of Agricultural and Food Chemistry, vol. 55, American Chemical Society, Nov. 23, 2007, pp. 10557-10562.
Australian Patent Examination Report for Patent Application No. 2013204683 dated Mar. 21, 2014, 4 pages.
Notification of the First Office Action for Chinese Patent Application No. 201480001531.0, dated Oct. 8, 2015, 23 pages.
Non-Final Office Action for U.S. Appl. No. 13/674,164, dated Jan. 8, 2016, 14 pages.
Non-Final Office Action for U.S. Appl. No. 13/911,477, dated Feb. 26, 2016, 9 pages.
Maren, "Wine Cork Wreath—Part 1," a constant project, Nov. 2, 2010, 3 pages, http://aconstantproject.blogspot.de/2010/11/wine-cork-wreath-part-1.html.
Extended European Search Report for European Patent Application No. 13800082.3, dated Feb. 26, 2016, 6 pages.
International Preliminary Report on Patentability for PCT/US2014/015313, dated Jul. 7, 2015, 18 pages.
Notification of the First Office Action for Chinese Patent Application No. 2012800668445, dated Jul. 27, 2015, 35 pages.
Notification of the First Office Action for Chinese Patent Application No. 201380039735.9, dated Sep. 15, 2015, 25 pages.
International Preliminary Report on Patentability for PCT/US2014/033177, dated Oct. 15, 2015, 8 pages.
Non-Final Office Action for U.S. Appl. No. 13/911,434, dated Mar. 9, 2017, 14 pages.
Notice of Allowance for U.S. Appl. No. 13/911,477, dated Feb. 27, 2017, 7 pages.
Final Office Action for U.S. Appl. No. 14/246,627, dated May 22, 2017, 25 pages.
Notification of the Second Office Action for Chinese Patent Application No. 201480001531.0, dated Jul. 18, 2016, 22 pages.
Non-Final Office Action for U.S. Appl. No. 14/086,367, dated Aug. 26, 2016, 7 pages.
Advisory Action and Examiner-Initiated Interview Summary for U.S. Appl. No. 13/911,434, dated Aug. 26, 2016, 6 pages.
Final Office Action for U.S. Appl. No. 13/911,477, dated Aug. 26, 2016, 12 pages.
Final Office Action for U.S. Appl. No. 13/674,164, dated Sep. 23, 2016, 13 pages.
Non-Final Office Action for U.S. Appl. No. 14/246,627, dated Oct. 12, 2016, 18 pages.
First Examination Report for Chilean Patent Application No. 2014-003323, dated Jan. 5, 2018 (10 pages including English translation).
Notice of Allowance for U.S. Appl. No. 14/246,627, dated Mar. 8, 2018, 10 pages.
Final Office Action for U.S. Appl. No. 13/911,434, dated May 5, 2016, 15 pages.
English Translation of Notification of the First Office Action for Chinese Patent Application No. 201380060842.X, dated Mar. 2, 2016, 14 pages.
Examination Report for European Patent Application No. 14706738.3, dated Nov. 10, 2017, 7 pages.
First Examination Report for Chilean Patent Application No. 2014-003320, dated Jan. 3, 2018 (10 pages including English translation).
Translated Summary of the First Examination Report for Chilean Patent Application No. 01232-2014, dated Jun. 21, 2017, 2 pages.
Non-Final Office Action for U.S. Appl. No. 14/086,367, dated Jun. 30, 2017, 7 pages.
Non-Final Office Action for U.S. Appl. No. 13/674,164, dated Jun. 20, 2017, 13 pages.
Advisory Action for U.S. Appl. No. 14/246,627, dated Aug. 28, 2017, 9 pages.
Final Office Action for U.S. Appl. No. 13/911,434, dated Mar. 5, 2019, 18 pages.
Author Unknown, "Kraton G SEBS/SEPS," Product Specification, kraton.com:80/Products/Kraton_G_SEBS_SEPS, May 22, 2011, Kraton Performance Polymers Inc., 2 pages.
Notice of Allowance for U.S. Appl. No. 13/674,164, dated May 18, 2018, 8 pages.
Notice of Allowance for U.S. Appl. No. 13/674,164, dated Sep. 25, 2018, 8 pages.
Examination Report for European Patent Application No. 12787419.6, dated Mar. 24, 2016, 6 pages.
Examination Report for European Patent Application No. 12787419.6, dated Oct. 28, 2016, 4 pages.
Examination Report for European Patent Application No. 12787419.6, dated Sep. 6, 2017, 4 pages.
Notification of the Second Office Action for Chinese Patent Application No. 2012800668445, dated Apr. 1, 2016, 9 pages.
Notification of the Third Office Action for Chinese Patent Application No. 2012800668445, dated Oct. 8, 2016, 8 pages.
Notification of the Fourth Office Action for Chinese Patent Application No. 2012800668445, dated Jun. 2, 2017, 8 pages.
Non-final Office Action for U.S. Appl. No. 13/911,434, dated Jul. 26, 2018, 13 pages.
Australian Patent Examination Report for Australian Patent Application No. 2013204654, dated Jan. 20, 2016, 3 pages.
Examination Search Report for Canadian Patent Application No. 2,875,439, dated Mar. 10, 2015, 4 pages.
Examination Search Report for Canadian Patent Application No. 2,875,439, dated Nov. 16, 2015, 7 pages.
Notification of the First Office Action for Chinese Patent Application No. 201380039744.8, dated Sep. 2, 2015, 31 pages.
Notification of the Second Office Action for Chinese Patent Application No. 201380039744.8, dated Jul. 18, 2016, 27 pages.
Notification of the Third Office Action for Chinese Patent Application No. 201380039744.8, dated Feb. 4, 2017, 10 pages.
Notification of the Fourth Office Action for Chinese Patent Application No. 201380039744.8, dated Oct. 20, 2017, 8 pages.
Examination Report for European Patent Application No. 13728148.1, dated Dec. 11, 2015, 4 pages.
Australian Patent Examination Report for Australian Patent Application No. 2013204663, dated Dec. 9, 2014, 4 pages.
Examination Search Report for Canadian Patent Application No. 2,875,608, dated Feb. 24, 2015, 3 pages.
Examination Search Report for Canadian Patent Application No. 2,875,608, dated Nov. 20, 2015, 3 pages.
Examination Report for European Patent Application No. 13800082.3, dated Sep. 21, 2017, 5 pages.
Non-Final Office Action for U.S. Appl. No. 14/086,367, dated May 4, 2018, 7 pages.
First Examination Report for Chilean Patent Application No. 2015-001303, dated Apr. 26, 2017, 16 pages.
Notification of the Second Office Action Office Action for Chinese Patent Application No. 201380060842.X, dated Nov. 9, 2016, 24 pages.
Notification of the Third Office Action Office Action for Chinese Patent Application No. 201380060842.X, dated Jul. 28, 2017, 25 pages.
Examination Report for European Patent Application No. 13799174.1, dated Dec. 22, 2016, 6 pages.
Examination Report for European Patent Application No. 13799174.1, dated Jan. 10, 2018, 8 pages.
Australian Patent Examination Report for Australian Patent Application No. 2013205007, dated Apr. 16, 2015, 6 pages.
Examination Search Report for Canadian Patent Application No. 2,875,675, dated Mar. 5, 2015, 5 pages.
Examination Search Report for Canadian Patent Application No. 2,875,675, dated Nov. 27, 2015, 6 pages.
Notification of the Third Office Action for Chinese Patent Application No. 201480001531.0, dated Jan. 26, 2017, 29 pages.

(56) References Cited

OTHER PUBLICATIONS

Notification of the Fourth Office Action for Chinese Patent Application No. 201480001531.0, dated Oct. 25, 2017, 27 pages.
Notice of Allowance for U.S. Appl. No. 14/246,627, dated Jun. 27, 2018, 7 pages.
Australian Patent Examination Report for Australian Patent Application No. 2013204542, dated Apr. 16, 2015, 5 pages.
Examination Report for European Patent Application No. 14721710.3, dated Oct. 13, 2016, 7 pages.
Examination Report for European Patent Application No. 14721710.3, dated Apr. 12, 2017, 6 pages.
Examination Report for European Patent Application No. 14721710.3, dated Feb. 20, 2018, 4 pages.
Examination Report for European Patent Application No. 13799174.1, dated Jan. 30, 2019, 3 pages.
International Preliminary Report on Patentability for International Patent Application No. PCT/EP2012/072155, dated May 22, 2014, 7 pages.
International Search Report and Written Opinion for International Patent Application No. PCT/EP2013/061433, dated Sep. 10, 2013, 12 pages.
Intention to Grant for European Patent Application No. 14706738.8, dated Sep. 14, 2018, 6 pages.
First Office Action for Chinese Patent Application No. 201810877428.2, dated May 5, 2019, 10 pages.
De Beer, D. et al., "Phenolics: A Comparison of Diverse Analytical Methods," American Journal of Enology and Viticulture, vol. 55, Issue 4, 2004, American Society for Encology and Viticulture, pp. 389-400.
Advisory Action for U.S. Appl. No. 13/911,434, dated Jun. 10, 2019, 5 pages.
Non-Final Office Action for U.S. Appl. No. 14/086,367, dated May 29, 2019, 7 pages.

* cited by examiner

CLOSURE FOR A PRODUCT-RETAINING CONTAINER

PRIORITY APPLICATION

The present application claims priority to U.S. Provisional Patent Application Ser. No. 61/762,569 filed on Feb. 8, 2013 entitled "CLOSURE FOR A PRODUCT-RETAINING CONTAINER," which is incorporated herein by reference in its entirety.

FIELD OF THE DISCLOSURE

The present disclosure relates to a closure for a product retaining container, to a method of preparing a closure for a product retaining container, to a closure that is obtainable by a method of the present disclosure, and to a use of the disclosed closure for sealingly closing a product-retaining container.

BACKGROUND

In view of the wide variety of products that are sold for being dispensed from containers, particularly containers with round necks which define the dispensing portal, numerous constructions have evolved for container stoppers or closure means for the portals, including for example screw caps, stoppers, corks and crown caps, to name a few. Generally, products such as vinegar, vegetable oils, laboratory liquids, detergents, honey, condiments, spices, alcoholic beverages, and the like, have similar needs regarding the type and construction of the closure means used for containers for these products. However, wine sold in bottles represents the most demanding product in terms of bottle closure technology. In an attempt to best meet these demands, most wine bottle closures or stoppers have been produced from a natural material known as "cork."

While natural cork still remains a dominant material for wine closures, synthetic wine closures have become increasingly popular over the last years, largely due to the shortage in high quality natural cork material and the awareness of wine spoilage as a result of "cork taint," a phenomenon that is associated with natural cork materials. In addition, synthetic closures have the advantage that by means of closure technology, their material content and physical characteristics can be designed, controlled and fine-tuned to satisfy the varying demands that the wide range of different wine types produced throughout the world impose on closures.

One of the principal difficulties to which any bottle closure is subjected in the wine industry is the manner in which the closure is inserted into the bottle. Typically, the closure is placed in a jaw clamping member positioned above the bottle portal. The clamping member incorporates a plurality of separate and independent jaw members which peripherally surround the closure member and are movable relative to each other to compress the closure member to a diameter substantially less than its original diameter. Once the closure member has been fully compressed, a plunger moves the closure means from the jaws directly into the neck of the bottle, where the closure member is capable of expanding into engagement with the interior diameter of the bottle neck and portal, thereby sealing the bottle and the contents thereof.

In view of the fact that the jaw members are generally independent of each other and separately movable in order to enable the closure member to be compressed to the substantially reduced diameter, each jaw member comprises a sharp edge which is brought into direct engagement with the closure member when the closure member is fully compressed. Score lines are frequently formed on the outer surface of the closure member, which prevents a complete, leak-free seal from being created when the closure member expands into engagement with the bottle neck. This can occur, for example, if the jaw members of the bottling equipment are imperfectly adjusted or worn. Leakage of the product, particularly of liquid product, from the container can thus occur.

Thus, it is generally desirable that any synthetic bottle closure be able to withstand this conventional bottling and sealing method. Furthermore, many cork sealing members also incur damage during the bottling process, resulting in leakage or tainted wine.

Another issue in the wine industry is the capability of the wine stopper to withstand a pressure build up that can occur during the storage of the wine product after it has been bottled and sealed. Due to natural expansion of the wine during hotter months, pressure builds up, which can result in the bottle stopper being displaced from the bottle. As a result, it is generally desirable that the bottle stopper employed for wine products be capable of secure, intimate, frictional engagement with the bottle neck in order to resist any such pressure build up.

A further issue in the wine industry is the general desirability that secure, sealed engagement of the stopper with the neck of the bottle be achieved quickly, if not virtually immediately after the stopper is inserted into the neck of the bottle. During normal wine processing, the stopper is compressed, as detailed above, and inserted into the neck of the bottle to enable the stopper to expand in place and seal the bottle. However, such expansion desirably occurs immediately upon insertion into the bottle since many processors tip the bottle onto its side or neck down after the stopper is inserted into the bottle neck, allowing the bottle to remain stored in this position for extended periods of time. If the stopper is unable to rapidly expand into secure, intimate, frictional contact and engagement with the walls of the neck of the bottle, wine leakage can occur.

It is further desirable that the closure be removable from the bottle using a reasonable extraction force. Although actual extraction forces extend over a wide range, the generally accepted, conventional extraction force is typically below 100 pounds (445 Newtons).

In achieving a commercially viable stopper or closure, a careful balance must be made between secure sealing and providing a reasonable extraction force for removal of the closure from the bottle. Since the these two characteristics are believed to be in direct opposition to each other, a careful balance must be achieved so that the stopper or closure is capable of securely sealing the product, in particular the wine in the bottle, preventing or at least reducing both leakage and gas transmission, while also being removable from the bottle without requiring an excessive extraction force.

Furthermore, it is generally desirable that the closure has a low oxygen permeability. Too much oxygen can cause the premature spoilage of wine. In fact, oxidation may occur over a period of time to render the beverage undrinkable. Thus, it is desirable to effectively prevent or reduce oxygen from entering the bottle in order to extend and preserve the freshness and shelf life of the product. Any commercially viable wine stopper or closure should therefore generally have a low oxygen transfer rate (OTR).

In addition to the above, it is also desirable, for economic and environmental reasons, to reduce the total amount of material in a synthetic closure, particularly the amount of synthetic material. Since the size of the closure is determined by the size of the bottle neck, reducing the amount of material can principally be achieved by reducing the density of the closure, in particular of the core member, which is generally in the form of a foamed material comprising air- or gas-filled cells. However, reducing the density of the core member generally increases the deformability of the core member and thus of the synthetic closure, which in turn results in a worsened sealing capability and thus in increased leakage. In order to avoid this, a thicker and/or denser outer layer or skin is conceivable, as is the incorporation of a stiffer and/or denser central element within the core member. However, either of these approaches increases the total amount of material, thereby diminishing or even eliminating any advantages achieved by reducing the core density. It is also possible to reduce the amount of synthetic material by using filler material. Closures are known which incorporate natural or synthetic fibres into a synthetic matrix. For example, U.S. Pat. No. 6,085,923 describes a stopper made of a synthetic elastomer body containing a fibrous plug, or one or more fibre portions oriented longitudinally, in the elastomer body. The fibres are stated therein to reinforce the stopper, whereby the stopper body, and thus properties such as oxygen transfer and permeability, are not homogeneous. It would be advantageous to be able to control the properties of a closure incorporating filler material, in particular natural filler material, in the same way as a synthetic closure. It would be particularly advantageous to be able to achieve homogeneous properties within such a closure. It would also be advantageous to be able to ensure that the desirable properties for such a closure, for example making it suitable as a closure for a wine bottle, as described herein, are achievable in industrial scale production without significant deviation for individual closures.

In addition to the above, it is often desirable for synthetic closures to resemble natural cork closures as closely as possible in appearance. Both the longitudinal surface and the flat ends of cylindrical cork closures generally have an irregular appearance, for example showing naturally occurring irregularities in color, structure and profile. Methods have been developed for providing synthetic closures with a physical appearance similar to natural cork, for example by blending colors to produce a streaking effect in the outer portion of the closure, along the cylindrical axis, or to provide the flat terminating ends of a synthetic closure with a physical appearance similar to natural cork.

The cork industry generates large quantities of cork powders resulting from the final stages of cork processing or from existing cork products. Such cork powders are generally considered to be waste products and are burned to feed boilers in industrial processes. It would be advantageous to transform cork powders into a high value composite product. It is known to incorporate cork powders and cork granulates into composites with polymers. The incorporation of cork powder into a synthetic matrix can, however, be detrimental to the processing and performance properties thereof. Composites comprising large amounts of cork powder, for example more than about 50 wt. % of cork powder, based on the total weight of the composite, tend to have properties such as hardness, density and permeability which make them unsuitable as closures for wine bottles. In addition, crosslinkers are often required in order to improve properties. However, these crosslinkers can raise issues of food safety when used in products which come into contact with foodstuffs. Composites comprising cork granules, on the other hand, generally have the disadvantage that the cork granules distributed within the matrix contribute to or even dominate the mechanical and permeability properties of the composite, making them non-uniform throughout the composite. In order to be usable as closures for wine bottles, uniform properties throughout the closure are desirable. Furthermore, it is more difficult to remove haloanisoles, in particular trichloroanisole (TCA) and other anisoles that can cause organoleptic problems, such as tribromoanisole (TBA), tetrachloroanisole (TeCA) and pentachloroanisole (PCA), from cork granules than from cork powder, so that closures including cork granules risk the problem of so-called cork taint. Closures incorporating cork material in a synthetic matrix have been previously described. For example, FR 2 799 183 describes synthetic closures consisting of a mixture of cork granulate and cork powder in a polyurethane matrix. The mixture of cork granulate and powder is said to be necessary for the homogeneity of the closure. However, the properties of such closures are generally not homogeneous throughout because of the presence of different "zones" comprising either cork or polyurethane. Furthermore, such closures can crumble and even fall apart because of weaknesses in the matrix arising from the incorporation of larger cork granules. In addition, the preparation method for closures incorporating cork products in a polyurethane matrix generally involves combining the cork products with polyurethane monomers, oligomers, or pre-polymers, and polymerizing in situ. However, residual monomers and low molecular weight compounds such as dimers, trimers, and other oligomers, remain in the matrix and/or in the cork materials. These residual monomers and low molecular weight compounds may not be compatible with food safety considerations, since they can migrate into food products which are in contact with the closure. It would be advantageous for a closure to overcome these problems as far as possible.

It is, furthermore, often desirable to provide decorative indicia such as letters and ornaments on the surface of wine stoppers (e.g. the crest or emblem of a winery). Natural corks are generally marked by a method commonly referred to as "fire branding," i.e., by the application of a hot branding tool. Alternatively, natural corks may also be branded by application of colors or dyes. Due to food safety concerns, marking of natural corks with colors or dyes is generally only effected on the curved cylindrical surface of the cork that is not in direct contact with the wine. On the other hand, marking on the flat terminating surfaces of natural corks is generally effected by means of fire branding only since this method does not impose any food safety concerns.

It is also known to brand synthetic closures. Synthetic closures are commonly branded by means of inkjet or offset printing using special dyes or colors approved for indirect food contact. Since such colors and dyes are normally not approved for direct food contact, marking of synthetic closures with colors or dyes is generally only effected on the curved cylindrical surface of the cork that is not in direct contact with the wine. Such marking can be on the outermost surface, or on an inner surface which is subsequently covered with an outer, preferably substantially transparent, layer. Marking on the flat terminating surfaces of synthetic closures is generally only known for injection molded closures, where marking is effected during the molding process of the closure by providing raised portions on the flat terminating surfaces.

Methods are available for marking the flat terminating surface of synthetic closures that have been manufactured by means of extrusion, in particular by co-extrusion. Laser marking may, in theory, be a feasible method since it allows the avoidance of direct food contact. This method is, however, inherently slow and expensive since it requires the use of special laser dye additives. Also, there have been concerns that laser marking of the flat terminating surfaces of synthetic closures may adversely change the foam structure of the core element, which may, in consequence, adversely affect the sensitive gas permeation properties of such closures.

A further method involves the application of a decorative layer, in particular of a decorative plastic layer, by means of heat and/or pressure transfer. This method allows for permanent branding of synthetic closures without giving rise to concerns relating to food safety and without negatively impacting the gas permeation and/or mechanical properties of synthetic closures, in particular of co-extruded synthetic closures.

Therefore, there exists a need for a synthetic closure or stopper which particularly comprises at least one of the characteristic features described above, said synthetic closure or stopper having a physical appearance and/or tactile characteristics similar in at least one aspect to a natural cork closure, particularly with only minimal impairment, particularly with no impairment or even with improvement of the other properties of the closure such as, inter alia, OTR, leakage, ease of insertion and removal, compressibility and compression recovery, compatibility with food products.

Other and more specific needs will in part be apparent and will in part appear hereinafter.

SUMMARY OF THE DETAILED DESCRIPTION

As will become evident from the following detailed disclosure, the synthetic closure of the present disclosure may be employed as a bottle closure or stopper for any desired product. However, for the reasons detailed above, wine products impose the most burdensome standards on a bottle closure. Consequently, in order to clearly demonstrate the universal applicability of the synthetic closure of the present disclosure, the following disclosure focuses on the applicability and usability of the synthetic closure of the present disclosure as a closure or stopper for wine containing bottles. However, this discussion is for exemplary purposes only and is not intended as a limitation of the present disclosure.

As discussed above, a bottle closure or stopper for wine must be capable of performing numerous separate and distinct functions. One principal function is the ability to withstand the pressure build up due to temperature variations during storage, as well as prevent any seepage or leakage of the wine from the bottle. Furthermore, a tight seal must also be established to prevent unwanted gas exchange between ambient conditions and the bottle interior, so as to prevent any unwanted oxidation or permeation of gases from the wine to the atmosphere. In addition, the unique corking procedures employed in the wine industry also impart substantial restrictions on the bottle closure, requiring a bottle closure which is highly compressible, has high immediate compression recovery capabilities and can resist any deleterious effects caused by the clamping jaws of the bottle closure equipment.

Although prior art synthetic products have been produced in an attempt to satisfy the need for alternate bottle closures employable in the wine industry, such prior art systems have often been found lacking in one or more of the generally desirable aspects of a bottle closure for wine products. However, by employing the present disclosure, many of the prior art disadvantages have been reduced or even obviated and an effective, easily employed, mass-produced synthetic closure has been realized.

In the present disclosure, many of the prior art disadvantages can be reduced or even overcome by achieving a synthetic closure for a product retaining container constructed for being inserted and securely retained in a portal forming neck of said container and a method for producing such a synthetic closure.

In one aspect the present disclosure provides for a synthetic closure for a product-retaining container constructed for being inserted and securely retained in a portal-forming neck of said container, said closure comprising at least
a) a core member comprising at least one thermoplastic polymer, and
b) at least one peripheral layer at least partially surrounding and intimately bonded to at least one surface of the core member, said peripheral layer comprising at least one thermoplastic polymer, wherein
the synthetic closure is formed by extrusion, and
at least one of the core member and the peripheral layer comprises a plurality of cells and wherein the synthetic closure comprises cork powder.

According to one aspect of the closure according to the present disclosure, the closure comprises a core member and does not comprise a peripheral layer. In this aspect, the cork powder is comprised in the core member. This aspect can be advantageous particularly in reducing cost per closure, and simplifying the production.

According to another aspect of the present disclosure, the closure comprises at least one peripheral layer at least partially surrounding and intimately bonded to at least one surface of the core member. The at least one peripheral layer is generally desirable in attaining a synthetic bottle closure which is suitable as a closure or stopper for the wine industry. The closure may comprise more than one peripheral layer, for example two, three or four peripheral layers.

Due to the operation of the cooperating jaws which are employed to compress the stopper for insertion into the bottle, sharp edges of the jaw members are forced into intimate contact with the outer surface of the stopper. Prior art closures have been known to be incapable of resisting these cutting forces. As a result, longitudinal cuts, score lines or slits can be formed in the outer surface of the stopper, enabling liquid to seep from the interior to the exterior of the bottle. This disadvantage, existing with prior art cork and synthetic closures, can be reduced or even eliminated by incorporating at least one peripheral layer according to the present disclosure. In addition, by forming at least one peripheral layer as disclosed herein, the present disclosure provides a synthetic bottle closure which contributes to reducing or even overcoming the prior art disadvantages.

The present disclosure particularly provides a closure having at least one peripheral layer, particularly an outermost peripheral layer, with a tough, score and mar resistant surface. In this respect, it is advantageous according to this aspect of the present disclosure that said at least one peripheral layer comprises a density in the ranges disclosed herein.

According to a particular aspect of the present disclosure, the cork powder is comprised in at least one of the core member and the peripheral layer In a particular aspect of the present disclosure the cork powder is comprised in the core member and in the peripheral layer.

In a further aspect of the present disclosure the cork powder is comprised in the core member, and is substantially absent from the peripheral layer, if present.

In a particular aspect of the present disclosure the closure comprises a peripheral layer and the cork powder is comprised in the peripheral layer. According to this aspect the cork powder can be substantially absent from the core member.

In particular aspects of the closure disclosed herein, the cork powder is comprised in an amount in the range of from 0.5 wt. % to 75 wt. %, in particular 1 wt. % to 70 wt. %, more particularly in an amount in the range of from 1 wt. %, 2 wt. %, 3 wt. %, 4 wt. %, 5 wt. %, 6 wt. %, 7 wt. %, 8 wt. %, 9 wt. %, or 10 wt. %, to 70 wt. %, more particularly in an amount in the range of from 11 wt. %, 12 wt. %, 13 wt. %, 14 wt. %, 15 wt. %, 16 wt. %, 17 wt. %, 18 wt. %, 19 wt. % or 20 wt. % to 65 wt. %, more particularly in an amount in the range of from 21 wt. %, 22 wt. %, 23 wt. %, 24 wt. %, 25 wt. %, 26 wt. %, 27 wt. %, 28 wt. %, 29 wt. %, 30 wt. %, 31 wt. %, 32 wt. %, 33 wt. %, 34 wt. %, 35 wt. %, 36 wt. %, 37 wt. %, 38 wt. %, 39 wt. %, 40 wt. %, 41 wt. %, 42 wt. %, 43 wt. %, 44 wt. %, 45 wt. %, 46 wt. %, 47 wt. %, 48 wt. %, 49 wt. %, 50 wt. %, 51 wt. %, 52 wt. %, 53 wt. %, 54 wt. % or 55 wt. % to 60 wt. %, in each case based on the total weight of the synthetic closure. If the cork powder is comprised in the core member, or in the core member and in the peripheral layer, the cork powder is particularly comprised in the above ranges in an amount of at least 51 wt. %, particularly in an amount in the range of from 51 wt. % to 75 wt. %, more particularly in an amount in the range of from 51 wt. % to 70 wt. %, even more particularly in an amount in the range of from 51 wt. % to 65 wt. %, yet more particularly in an amount in the range of from 51 wt. % to 60 wt. %, in each case based on the total weight of the synthetic closure.

According to an aspect of the disclosure wherein the cork powder is comprised in the peripheral layer, the cork powder is comprised in an amount in the range of from 5 wt. % to 75 wt. %, based on the total weight of the peripheral layer, or in an amount in the range of from 0.5 wt. % to 15 wt. %, based on the total weight of the synthetic closure. If the cork powder is comprised in the peripheral layer and not comprised in the core member the cork powder can be comprised in an amount in the range of from 5 wt. %, 6 wt. %, 7 wt. %, 8 wt. %, 9 wt. %, or 10 wt. %, to 75 wt. %, more particularly in an amount in the range of from 11 wt. %, 12 wt. %, 13 wt. %, 14 wt. %, 15 wt. %, 16 wt. %, 17 wt. %, 18 wt. %, 19 wt. % or 20 wt. % to 70 wt. %, more particularly in an amount in the range of from 21 wt. %, 22 wt. %, 23 wt. %, 24 wt. %, 25 wt. %, 26 wt. %, 27 wt. %, 28 wt. %, 29 wt. %, 30 wt. %, 31 wt. %, 32 wt. %, 33 wt. %, 34 wt. %, 35 wt. %, 36 wt. %, 37 wt. %, 38 wt. %, 39 wt. %, 40 wt. %, 41 wt. %, 42 wt. %, 43 wt. %, 44 wt. %, 45 wt. %, 46 wt. %, 47 wt. %, 48 wt. %, 49 wt. %, 50 wt. %, 51 wt. %, 52 wt. %, 53 wt. %, 54 wt. % or 55 wt. % to 65 wt. %, in each case based on the total weight of the peripheral layer, or in an amount in the range of from 0.5 wt. %, 1 wt. %, 2 wt. %, 3 wt. %, 4 wt. %, 5 wt. %, 6 wt. %, 7 wt. %, 8 wt. %, 9 wt. % or 10 wt. % to 15 wt. %, based on the total weight of the synthetic closure, more particularly in an amount in the range of from 0.5 wt. %, 1 wt. %, 2 wt. %, 3 wt. %, 4 wt. %, 5 wt. %, 6 wt. % or 7 wt. % to 12 wt. %, based on the total weight of the synthetic closure, more particularly in an amount in the range of from 0.5 wt. %, 1 wt. %, 2 wt. %, 3 wt. %, 4 wt. %, 5 wt. %, 6 wt. % or 7 wt. % to 10 wt. %, based on the total weight of the synthetic closure.

The cork powder according to the present disclosure particularly comprises particles having a particle size measured according to ISO 2030:1990, in the range of from 1 μm to 2000 μm, particularly in the range of from 1 μm to 1500 μm, more particularly in the range of from 1 μm to 1200 μm, even more particularly in the range of from 1 μm to 1000 μm, yet more particularly in the range of from 1 μm to 900 μm, even more particularly in the range of from 1 μm to 800 μm, even more particularly in the range of from 1 μm to 700 μm, even more particularly in the range of from 1 μm to 600 μm, and more particularly in the range of from 1 μm to 500 μm.

The closure of the present disclosure particularly comprises at least one peripheral layer intimately bonded to substantially the entire substantially cylindrical surface of the core member. If any large unbonded areas exist, flow paths for gas and liquid could result. Consequently, secure, intimate, bonded interengagement of the at least one peripheral layer with the core member is advantageous for attaining a bottle closure for the wine industry.

In order to achieve integral bonded interconnection between the at least one peripheral layer and the core member, the at least one peripheral layer is formed about the core member in a manner which assures intimate bonded engagement. The closure according to the present disclosure is formed by extrusion.

Particularly, the desired secure, intimate, bonded, interengagement is attained by simultaneous co-extrusion of the at least one peripheral layer and the core member or by applying the at least one peripheral layer to the continuous, elongated length of material after the continuous, elongated length of material has been formed. By employing either process, intimate bonded interengagement of the at least one peripheral layer to the continuous, elongated length of material is attained.

In a particular aspect of the present disclosure, therefore, the synthetic closure is produced by a process comprising at least a process step of coextrusion. According to this aspect of the disclosure, the synthetic closure comprises a core member and a peripheral layer, which are formed by co-extrusion. Suitable co-extrusion methods are known to the skilled person. Co-extrusion allows an advantageous bonding of the peripheral layer to the core member.

In one aspect of the present disclosure, said core member and said at least one peripheral layer are extruded substantially simultaneously.

In another aspect of the present disclosure, said core member is extruded separately and subsequent thereto said at least one peripheral layer is formed in extrusion equipment peripherally surrounding and enveloping the preformed core member.

In further aspects of the disclosed closure, comprising two or more peripheral layers, it is possible that a first peripheral layer which is in secure, intimate, bonded, interengagement with the outer cylindrical surface of the core member is formed by either substantially simultaneous extrusion with the core member, or by subsequent extrusion, as described herein. A second and subsequent peripheral layers can then be formed likewise by either substantially simultaneous extrusion with the core member and the first or further peripheral layers, or by subsequent extrusion, as described herein for the first peripheral layer. With multiple peripheral layers it is also possible that two or more peripheral layers are extruded subsequently, as described herein, but substantially simultaneously with each other.

According to a particular aspect of the synthetic closure according to the present disclosure, it is produced by a process comprising at least a process step of maintaining an extrusion temperature in the range of from about 120° C. to about 170° C., or in the range of from about 125° C. to about 170° C., or in the range of from about 130° C. to about 165° C., or in the range of from about 135° C. to about 165° C., or in the range of from about 140° C. to about 160° C. An extrusion temperature in the disclosed range is particularly maintained during extrusion of a material comprising cork particles. If the temperature exceeds this range there is a risk of discoloration and/or degradation of the cork particles, as well as burnt aromas which could affect a food product coming into contact with the closure.

The core member comprises a plurality of cells. Such a plurality of cells can be achieved, for example, in a foamed material, also referred to as a foam or as a foamed plastic. The closure according to the present disclosure particularly comprises at least one foamed material. In a particular aspect of the method, the core member comprises a foamed material. The peripheral layer can also comprise a plurality of cells, for example in the form of an at least partially foamed material. However, the at least one peripheral layer, if present, is formed with a substantially greater density than the core material, in order to impart desired physical characteristics to the synthetic bottle closure of the present disclosure. According to an exemplary aspect of the method according to the present disclosure, the core member is foamed and the at least one peripheral layer is substantially not foamed, particularly not foamed. It is also conceivable for the peripheral layer to be foamed, for example by means of a small amount of foaming agent or expandable microspheres in the peripheral layer, for example to make it more flexible. However, the peripheral layer advantageously still has a higher density than the core member. It is advantageous that the cell size and/or cell distribution in the foam, particularly in the core member, are substantially uniform throughout the entire length and/or diameter of the foamed material, particularly are substantially uniform throughout the entire length and/or diameter of the core member. In this way closures with substantially uniform properties, such as, for example OTR, compressibility and compression recovery, can be provided. According to a particular aspect of the synthetic closure disclosed herein, therefore, at least one of the size and the distribution of the plurality of cells in the core member is substantially uniform throughout at least one of the length and the diameter of the core member.

The plurality of cells of the disclosed closure is further advantageously defined as being a plurality of substantially closed cells, or that the foam is a substantially closed cell foam. In particular, the core member is exemplarily defined as comprising substantially closed cells. Closed cell foams are generally defined as comprising cells, also referred to as pores, which are substantially not interconnected with each other. Closed cell foams have higher dimensional stability, lower moisture absorption coefficients, and higher strength compared to open-cell-structured foams.

It is therefore a particular aspect of the synthetic closure disclosed herein that the plurality of cells is a plurality of substantially closed cells.

In order to assure that the core member of the closure possesses inherent consistency, stability, functionality and capability of providing long-term performance, the cell size of the core material is particularly substantially homogeneous throughout its entire length and diameter. According to a particular aspect of the synthetic closure disclosed herein, the plurality of cells comprises a cell size in a range of from about 0.025 mm to about 0.5 mm, in particular from about 0.05 mm to about 0.35 mm. The cell size is measured according to standard test methods known to the skilled person.

In another exemplary aspect of the present disclosure, the core member comprises closed cells having at least one of closed cells having an average cell size ranging from about 0.02 millimeters to about 0.50 millimeters and a cell density ranging from about 8,000 cells/cm$^3$ to about 25,000,000 cells/cm$^3$. Although this cell configuration has been found to produce a highly effective product, it has been found that even more advantageous products are those wherein said core member comprises at least one of an average cell size ranging from about 0.05 mm to about 0.1 mm and a cell density ranging from about 1,000,000 cells/cm$^3$ to about 8,000,000 cells/cm$^3$.

In order to control the cell size in the core member of the closure, and attain the desired cell size detailed above, a nucleating agent can be employed. In a particular embodiment, it has been found that by employing a nucleating agent selected from the group consisting of calcium silicate, talc, clay, titanium oxide, silica, barium sulfate, diatomaceous earth, and mixtures of citric acid and sodium bicarbonate, the desired cell density and cell size is achieved.

As is well known in the industry, a blowing agent can be employed in forming extruded material, for example extruded foam plastic material, such as is advantageous for the core member. In the present disclosure, a variety of blowing agents can be employed during the extrusion whereby the core member is produced. Typically, either physical blowing agents or chemical blowing agents are employed. Suitable blowing agents that have been found to be efficacious in producing the core member of the present disclosure comprise one or more selected from the group consisting of: aliphatic hydrocarbons having 1-9 carbon atoms, halogenated aliphatic hydrocarbons having 1-9 carbon atoms and aliphatic alcohols having 1-3 carbon atoms. Aliphatic hydrocarbons include methane, ethane, propane, n-butane, isobutane, n-pentane, isopentane, neopentane, and the like. Among halogenated hydrocarbons and fluorinated hydrocarbons they include, for example, methylfluoride, perfluoromethane, ethyl fluoride, 1,1-difluoroethane (HFC-152a), 1,1,1-trifluoroethane (HFC-430a), 1,1,1,2-tetrafluoroethane (HFC-134a), pentafluoroethane, perfluoroethane, 2,2-difluoropropane, 1,1,1-trifluoropropane, perfluoropropane, perfluorobutane, perfluorocyclobutane. Partially hydrogenated chlorocarbon and chlorofluorocarbons for use in this disclosure include methyl chloride, methylene chloride, ethyl chloride, 1,1,1-trichlorethane, 1,1-dichlorol-fluoroethane (HCFC-141b), 1-chloro-1,1-difluoroethane (HCFC-142b), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromenthane (CFC11), dichlorodifluoromenthane (CFC-12), trichlorotrifluoroethane (CFC-113), dichlorotetrafluoroethane (CFC-114), chloroheptafluoropropane, and dichlorohexafluoropropane. Fully halogenated chlorofluorocarbons are not preferred due to their ozone depletion potential. Aliphatic alcohols include methanol, ethanol, n-propanol and isopropanol. Chemical blowing agents include azodicarbonamic, azodiisobutyro-nitride, benzenesulfonhydrazide, 4,4-oxybenzene sulfonylsemicarbazide, p-toluene sulfonylsemicarbazide, barium azodicarboxlyate, N,N'-Dimethyl-N,N'-dinitrosoterephthalamide, trihydrazinotriazine, and hydrocerol.

In a particular aspect, inorganic, or physical, blowing agents are used in making the core member according to the present disclosure. Examples of inorganic blowing agents include carbon dioxide, water, air, helium, nitrogen, argon, and mixtures thereof. Carbon dioxide and nitrogen are particularly useful blowing agents.

Expandable microspheres can also be considered as blowing agent according to the present disclosure.

According to another exemplary embodiment of the present disclosure, in order to produce the desired product, the blowing agent may be incorporated into the plastic material in a quantity ranging from about 0.005% to about 10% by weight of the weight of the plastic material. The term "plastic material" refers to the material from which at least one of the core member and the peripheral layer is formed, in particular the thermoplastic polymer or combination of thermoplastic polymers from which at least one of the core member and the peripheral layer is formed, which may also comprise cork powder as described herein.

The closure according to the present disclosure particularly has a substantially cylindrical shape comprising substantially flat terminating surfaces forming the opposed ends of said closure and the substantially flat terminating surfaces of the core member are substantially devoid of the peripheral layer. The closure has a substantially cylindrical form comprising a substantially cylindrical peripheral surface and two substantially flat terminating faces at the opposing ends of the cylindrical form. In addition to a core member which possesses a construction with physical characteristics similar to natural cork, and has a substantially cylindrical form with a substantially cylindrical peripheral surface, the closure of the present disclosure comprises at least one peripheral layer at least partially surrounding and intimately bonded to at least one surface, particularly the substantially cylindrical surface, of the core member. The ends of the closure can be beveled or chamfered, as is known from the prior art. Although any desired bevel or chamfered configuration can be employed, such as a radius, curve, or flat surface, it has been found that merely cutting the terminating ends at the intersection with the longitudinal cylindrical surface of the elongated length of material, with or without at least one peripheral layer as described herein, at an angle in the range of from about 30° to about 75°, for example in the range of from about 35° to about 70°, particularly in the range of from about 40° to about 65°, allows formation of a closure which is easier to insert into the neck of a container. Angles of about 45°, 46°, 47°, 48°, 49°, 50°, 51°, 52°, 53°, 54°, 55°, 56°, 57°, 58°, 59° or 60° have been found particularly to contribute to the present disclosure. The bevel or chamfer angle is measured relative to the longitudinal axis of the cylindrical closure. The chamfer angle for a closure for a still wine bottle is particularly within the above ranges, particularly with a chamfer length in the range of from about 0.4 mm to about 2.5 mm, particularly in the range of from about 0.5 mm to about 2.0 mm. Closures for sparkling wine bottles advantageously have a chamfer in the above range, but generally have a deeper and/or longer chamfer than closures for still wine bottles, for example having a chamfer angle in the range of from about 35° to about 55°, particularly in the range of from about 40° to about 50°, more particularly a chamfer angle of about 40°, 41°, 42°, 43°, 44°, 45°, 46°, 47°, 48°, 49° or 50°, and/or a chamfer length in the range of from about 3 mm to about 8 mm, particularly in the range of from about 4 mm to about 7 mm, particularly a chamfer length of about 3 mm, 4 mm, 5 mm, 6 mm, 7 mm or 8 mm.

According to a particular aspect of the present disclosure, the thermoplastic polymer comprised in the core member is a low density polymer having an unfoamed density in the range of from 0.7 g/cm$^3$ to 1.5 g/cm$^3$. This aspect is particularly advantageous if the core member comprises larger amounts of cork powder within the ranges disclosed herein, for example more than 25 wt. %, more than 30 wt. %, more than 35 wt. %, more than 40 wt. %, more than 45 wt. %, more than 50 wt. % and particularly more than 51 wt. % cork powder. A lower polymer density helps to compensate the increase in density of the closure resulting from inclusion of the cork powder.

In an exemplary aspect according to the method according to the present disclosure the synthetic bottle closure of the present disclosure comprises, as its principal component, a core member which is formed from extruded, foamed, thermoplastic polymers, copolymers, or homopolymers, or blends thereof. Although any known thermoplastic polymeric material, particularly any foamable thermoplastic polymeric material can be employed in the bottle closure of the present disclosure, the thermoplastic plastic material must be selected for producing physical properties similar to natural cork, so as to be capable of providing a synthetic closure for replacing natural cork as a closure for wine bottles. By way of example, the thermoplastic plastic material for the core member can be a closed cell plastic material.

According to an exemplary aspect of the method according to the present disclosure, said closure particularly comprises one or more thermoplastic polymers. Particularly at least one, particularly both of the core material and the material of the at least one peripheral layer comprise one or more thermoplastic polymers. In an exemplary aspect, the at least one peripheral layer comprises a thermoplastic polymer identical or similar to the thermoplastic polymer comprised in the core member. A peripheral layer can, on the other hand, comprise a thermoplastic polymer which is different to the thermoplastic polymer or thermoplastic polymers comprised in the core member. However, as detailed herein, the physical characteristics imparted to the peripheral layer particularly differ substantially from the physical characteristics of the core member, in particular the peripheral layer density is greater than the core member density.

In a particular aspect of the present disclosure the core member comprises at least one thermoplastic polymer selected from the group consisting of polyethylenes, metallocene catalyst polyethylenes, polybutanes, polybutylenes, polyurethanes, silicones, vinyl-based resins, thermoplastic elastomers, polyesters, ethylenic acrylic copolymers, ethylene-vinyl-acetate copolymers, ethylene-methyl-acrylate copolymers, thermoplastic polyurethanes, thermoplastic olefins, thermoplastic vulcanizates, flexible polyolefins, fluorelastomers, fluoropolymers, polyethylenes, polytetrafluoroethylenes, and blends thereof, ethylene-butyl-acrylate copolymers, ethylene-propylene-rubber, styrene butadiene rubber, styrene butadiene block copolymers, ethylene-ethyl-acrylic copolymers, ionomers, polypropylenes, and copolymers of polypropylene and copolymerizable ethylenically unsaturated comonomers, olefin copolymers, olefin block copolymers and mixtures thereof. If a polyethylene is employed, in an exemplary aspect of the method disclosed herein the polyethylene comprises one or more polyethylenes selected from the group consisting of high density, medium density, low density, linear low density, ultra high density, and medium low density polyethylenes. Particularly useful plastic materials for the core element can be polyethylene, in particular LDPE, and/or ethylene-vinyl-acetate copolymer (EVA). These materials can be used alone or in combination with one or more other thermoplastic polymers disclosed herein, in particular with metallocene PE or metallocene PP, particularly with metallocene PE. Expandable microspheres of one or more of these thermoplastic polymers can also be considered according to the present disclosure. Expandable microspheres are microscopic spheres comprising a thermoplastic shell encapsulating a low boiling point liquid hydrocarbon. When heated to a temperature high enough to soften the thermoplastic shell, the increasing pressure of the hydrocarbon causes the microsphere to expand. The volume can increase by 60 to 80 times.

According to another aspect of the present disclosure, the core member may further comprise at least one of at least one fatty acid and at least one fatty acid derivative. In order to achieve this, one or more fatty acid derivatives can be added to the at least one thermoplastic polymer which is used to prepare the core member. Exemplary fatty acid derivatives according to the present disclosure are fatty acid esters or fatty acid amides such as stearamides. The addition of at least one fatty acid derivative to the polymer composition of the synthetic closure imparts superior properties to the synthetic closure. In particular, it has been found that the oxygen transfer rate of the closure can be reduced substantially, thus further reducing unwanted oxidation of wine. In addition, it has been found that the use of a fatty acid derivative as additive does not have a negative impact on the performance characteristics of synthetic corks such as extraction force, ovality control, diameter control and length control. In order to impart the desired OTR-reducing effect to the closure, the fatty acid derivative, if present, is used according to an exemplary aspect of the present disclosure in a concentration from about 0.01 wt. % to about 10 wt. %, in particular from about 0.1 wt. % to about 5 wt. %, more particularly from about 1 wt. % to about 3 wt. %, based on the total weight of thermoplastic polymer.

Regardless of the thermoplastic polymer or thermoplastic polymers selected for forming the core member, in a further exemplary embodiment of the method according to the present disclosure, said core member is further defined as comprising a density ranging from about 100 kg/m$^3$ to about 600 kg/m$^3$. Although this density range has been found to provide an effective core member, according to an exemplary aspect of the present disclosure the density ranges from about 100 kg/m$^3$ to about 500 kg/m$^3$, in particular from about 150 kg/m$^3$ to about 420 kg/m$^3$, more particularly from about 200 kg/m$^3$ to about 350 kg/m$^3$.

According to an exemplary aspect of the present disclosure the peripheral layer comprises at least one thermoplastic polymer selected from the group consisting of polyethylenes, metallocene catalyst polyethylenes, polybutanes, polybutylenes, polyurethanes, silicones, vinyl-based resins, thermoplastic elastomers, polyesters, ethylenic acrylic copolymers, ethylene-vinyl-acetate copolymers, ethylene-methyl-acrylate copolymers, thermoplastic polyurethanes, thermoplastic olefins, thermoplastic vulcanizates, flexible polyolefins, fluorelastomers, fluoropolymers, polyethylenes, polytetrafluoroethylenes, and blends thereof, ethylene-butyl-acrylate copolymers, ethylene-propylene-rubber, styrene butadiene rubber, styrene butadiene block copolymers, ethylene-ethyl-acrylic copolymers, ionomers, polypropylenes, and copolymers of polypropylene and copolymerizable ethylenically unsaturated comonomers, olefin copolymers, olefin block copolymers, styrene ethylene butadiene styrene block copolymers, styrene ethylene butylene styrene block copolymers, styrene ethylene butylene block copolymers, styrene butadiene styrene block copolymers, styrene butadiene block copolymers, styrene isoprene styrene block copolymers, styrene isobutylene block copolymers, styrene isoprene styrene block copolymers, styrene ethylene propylene styrene block copolymers, styrene ethylene propylene block copolymers and combinations of two or more thereof.

According to an exemplary aspect of the present disclosure said at least one peripheral layer is further defined as comprising one selected from the group consisting of foamed plastics and non-foamed plastics, advantageously having a substantially greater density than the core member, in order to impart desired physical characteristics to the synthetic bottle closure of the present disclosure. In particular, the composition employed for the at least one peripheral layer is particularly selected to withstand the compression forces imposed thereon by the jaws of the corking machine. However, many different polymers, as detailed herein, are able to withstand these forces and, as a result, can be employed for the at least one peripheral layer.

In exemplary aspects of the method according to the present disclosure, the at least one peripheral layer comprises one or more materials selected from foamable thermoplastic polyurethanes, non-foamable thermoplastic polyurethanes, thermoplastic polyolefins, thermoplastic vulcanizates, EPDM rubber, polyolefins, particularly flexible polyolefins, particularly polyethylenes and polypropylenes, particularly metallocene polyethylenes and polypropylenes, fluoroelastomers, fluoropolymers, fluorinated polyolefins, particularly partially fluorinated or perfluorinated polyethylenes, particularly polytetrafluoroethylenes, olefin block copolymers, styrene block copolymers, for example styrene butadiene block copolymers, thermoplastic elastomers, polyether-type polyurethanes and mixtures or blends thereof. Particular examples of the plastic material for the at least one peripheral layer are polyethylene, polypropylene, EPDM rubber, styrene block copolymers, and mixtures or blends thereof. If desired, the at least one peripheral layer can be formed from a transparent material. Furthermore, the material selected for the at least one peripheral layer may be different from that of the core member.

In order to form synthetic bottle closures with all of the desirable inherent physical and chemical properties detailed above, it has been found advantageous to comprise metallocene catalyst polyethylene in at least one peripheral layer. As detailed herein, at least one peripheral layer may comprise substantially metallocene catalyst polyethylene as single component or, if desired, the metallocene catalyst polyethylene may be combined with one or more thermoplastic elastomers, particularly with one or more thermoplastic elastomers as detailed above. In this regard, it has been found advantageous that at least one peripheral layer particularly comprises one or more polyethylenes selected from the group consisting of medium density polyethylenes, medium low density polyethylenes, and low density polyethylenes in an amount in the range of from about 5% to about 100% by weight, particularly in the range of from about 15% to about 95% by weight, particularly in the range of from about 25% to about 90% by weight, based upon the weight of the entire composition A formulation which has been found to be highly effective in providing a peripheral layer comprises at least one styrene block copolymer. Suitable styrene block copolymers which come into consideration can be selected from the group consisting of styrene ethylene butadiene styrene block copolymers, styrene ethylene butylene styrene block copolymers, styrene ethylene butylene block copolymers, styrene butadiene styrene block copolymers, styrene butadiene block copolymers, styrene isobutylene block copolymers, styrene isoprene styrene block copolymers, styrene isoprene block copolymers, styrene ethylene propylene styrene block copolymers, styrene ethylene propylene block copolymers and combinations of two or more thereof. In particular aspects of the present disclosure, the at least one styrene block copolymer is selected from the group consisting of styrene ethylene butadiene styrene block copolymers, styrene ethylene butylene styrene block copolymers, styrene ethylene propylene styrene block copolymers, styrene ethylene propylene block copolymers and combinations of two or more thereof. Examples of commercially available styrene block copolymers according to the present disclosure are SBS, SIS, SEBS, SIBS, SEPS, SEEPS, MBS, which are available, for example under the trade names Styroflex® and Styrolux® (BASF Corporation of Wyandotte, Mich., USA), Septon® (Kuraray America, Inc., Houston, Tex., USA), Maxelast® TPE (Nantong Polymax Elastomer Technology Co., Ltd), GLOBALPRENE® Polymers (LCY Chemical Corporation), Elexar® and Monprene® (Teknor Apex Company), Elastocon® series (Elastocon TPE Technologies, Inc.), TPR (Washington Penn), Evoprene™ (Alpha Gary), Versaflex®, OnFlex®, Versalloy®, Versollan®, Dynaflex® (GLS Thermoplastic Elastomers), Sevrene™ (Vichem Corporation), Vector™ (Dexco Polymers LP), Calprene® and Solprene® (Dynasol), Multiflex® TEA and Multiflex® TPE (Multibase, Inc.), Europrene® Sol T (Polimeri Europe), Sunprene™ (PolyOne), Leostomer® (Riken Technos Corporation), RTP 2700 and 6000 series (RTP), Invision® (A. Schulman), Dryflex® (VTC Elastotechnik), Quintac® (Zeon), Megol® and Raplan® (API spa), Asaprene™ and Tufprene™ (Asahi Kasei), Lifoflex (Müller Kunststoffe, Germany), Thermolast® (Kraiburg TPE GmbH & Co. KG, Waldkraiberg, Germany) or Kraton®, for example Kraton® D, Kraton® G or Kraton® FG (Kraton Polymers, Houston, Tex., USA).

Another formulation which has been found to be highly effective in providing a peripheral layer comprises at least one thermoplastic vulcanizate.

Another formulation which has been found to be highly effective in providing a peripheral layer which provides at least one, particularly more than one, particularly almost all or even all physical and chemical attributes to attain a commercially viable closure comprises at least one of at least one polyether-type thermoplastic polyurethane and at least one olefin block copolymer or a blend of at least two thereof.

Each of the materials disclosed as suitable for a peripheral layer can be used alone or in combination with one or more of these materials. By employing this material or these materials and forming the material or the materials in peripheral, surrounding, bonded engagement with any desired foamed core member, a highly effective, multi-layer closure is attained which is able to provide at least one, particularly more than one, particularly almost all or even all properties suitable for a wine bottle closure.

In an exemplary construction of this embodiment, the particular polyether-type thermoplastic polyurethane employed for forming the at least one peripheral layer comprises Elastollan® LP9162, manufactured by BASF Corporation of Wyandotte, Mich. (US). This compound has been found to produce an outer layer in combination with the core member which provides at least one, particularly more than one, particularly almost all or even all of the physical and chemical characteristics suitable for attaining a highly effective closure for the wine industry.

In another exemplary aspect of the present disclosure, the peripheral layer comprises thermoplastic vulcanizates (TPV). Such thermoplastic vulcanizates are well known in the art and are commercially available, for example, under the tradename Santoprene® from ExxonMobil Chemical Company of Houston, Tex. (US), Sarlink® from Teknor Apex B.V., Geleen (NL) or OnFlex® from PolyOne Inc. of Avon Lake, Ohio (US).

In addition to employing the polyether-type thermoplastic polyurethane detailed above, another composition that has been found to be highly effective in providing at least one, particularly more than one, particularly almost all or even all of the desirable attributes for at least one peripheral layer is a blend of at least one polyolefin, particularly at least one thermoplastic polyolefin and at least one thermoplastic vulcanizate. In the exemplary aspect, the blend of at least one thermoplastic polyolefin and at least one thermoplastic vulcanizate comprises the thermoplastic polyolefin in an amount in the range of from about 10% to about 90% by weight, particularly in an amount in the range of from about 20% to about 80% by weight, particularly in an amount in the range of from about 30% to about 70% by weight, particularly in an amount in the range of from about 40% to about 60% by weight, based upon the weight of the entire composition of and the thermoplastic vulcanizate in an amount in the range of from about 90% to about 10% by weight, particularly in an amount in the range of from about 80% to about 20% by weight, particularly in an amount in the range of from about 70% to about 30% by weight, particularly in an amount in the range of from about 60% to about 50% by weight, based upon the weight of the entire composition. The construction of a closure using a peripheral layer formed from this blend provides a closure which is highly suitable for use as a wine bottle closure.

A further composition that has been found to be highly effective in providing at least one, particularly more than one, particularly almost all or even all of the desirable attributes for at least one peripheral layer is a blend of at least one polyolefin, particularly at least one thermoplastic polyolefin, and at least one styrene block copolymer, or a blend of at least one thermoplastic vulcanizate and at least one styrene block copolymer. In the exemplary aspect, the blend of at least one polyolefin or at least one thermoplastic vulcanizate and at least one styrene block copolymer comprises the polyolefin or the thermoplastic vulcanizate in an amount in the range of from about 5% to about 95% by weight, or in an amount in the range of from about 20% to about 80% by weight, or in an amount in the range of from about 30% to about 70% by weight, or in an amount in the range of from about 40% to about 60% by weight, based upon the weight of the entire composition of and the styrene block copolymer in an amount in the range of from about 95% to about 5% by weight, particularly in an amount in the range of from about 80% to about 20% by weight, particularly in an amount in the range of from about 70% to about 30% by weight, particularly in an amount in the range of from about 60% to about 40% by weight, based upon the weight of the entire composition. Exemplary weight ratios of styrene block copolymer to polyolefin or thermoplastic vulcanizate are about 95:5, about 90:10, about 85:15, about 80:20, about 75:25, about 70:30, about 65:35, about 60:40, about 55:45, about 50:50, based on the total weight of styrene block copolymer and polyolefin or styrene block copolymer and thermoplastic vulcanizate. The construction of a closure using a peripheral layer formed from this blend provides a closure which is highly suitable for use as a wine bottle closure.

In a further alternate embodiment, a highly effective closure is attained by employing at least one of at least one metallocene catalyst polyethylene and at least one olefin block copolymer, either independently or in combination with at least one selected from the group consisting of low density polyethylenes, medium density polyethylenes, and medium low density polyethylenes. In this embodiment, these materials are particularly employed for both core member and peripheral layer.

Still further additional compounds which have been found to provide highly effective peripheral layers for forming closures, in accordance with the present disclosure, comprise Teflon®, fluoroelastomeric compounds and fluoropolymers. These compounds, whether employed individually or in combination with each other or with the other compounds detailed above have been found to be highly effective in producing a peripheral layer which is capable of providing at least one, particularly more than one, particularly almost all or even all of the properties making it suitable for synthetic bottle closures.

Any of the compounds detailed herein for providing the at least one peripheral layer can be employed alone or in combination with each other, using the extrusion processes detailed above to produce a peripheral layer which is securely and integrally bonded to the core member and/or to a different peripheral layer, as a foamed outer layer or a non-foamed outer layer, or as an intermediate layer.

Depending upon the sealing process to be employed for inserting the synthetic closure produced by the method of the present disclosure in a desired bottle, additives, such as slip additives, lubricating agents, and sealing compounds may be incorporated into at least one outer, peripherally surrounding layer of the synthetic closure produced by the method of the present disclosure, for example to provide lubrication of the synthetic closure during the insertion process. In addition, other additives typically employed in the bottling industry may also be incorporated into the synthetic closure produced by the method of the present disclosure for improving the sealing engagement of the synthetic closure with the bottle as well as reducing the extraction forces necessary to remove the synthetic closure from the bottle for opening the bottle.

The at least one peripheral layer, if present, particularly the outer peripheral layer is particularly formed with a thickness and/or a density which are capable of imparting desired physical characteristics, such as resistance to bottling conditions, to the closure produced by the method of the present disclosure. The at least one peripheral layer, particularly the outer peripheral layer is, in particular, formed with a substantially greater density than the inner core and/or with a selected thickness.

Accordingly, said at least one peripheral layer is particularly further defined as comprising a thickness ranging from about 0.05 mm to about 5 mm. Although this range has been found to be efficacious for producing a closure which is completely functional and achieves all of the desired goals, the exemplary aspect for wine bottles particularly comprises a thickness ranging from about 0.1 mm to about 2 mm, whereby exemplary lower limits for the thickness are about 0.05 mm, about 0.06 mm, about 0.07 mm, about 0.08 mm, about 0.09 mm, about 0.1 mm, about 0.2 mm, about 0.3 mm, about 0.4 mm or about 0.5 mm and exemplary upper limits for the thickness are about 1 mm, about 2 mm, about 3 mm, about 4 mm, or about 5 mm. The exemplary thickness of the at least one peripheral layer can be selected according to criteria such as, for example, the composition, physical properties and/or density of the material of the at least one peripheral layer, and the desired properties of the at least one peripheral layer.

The method according to the present disclosure particularly provides a peripheral layer with a tough, score and mar resistant surface. In this respect, it is advantageous according to this aspect of the method according to the present disclosure that said at least one peripheral layer is further defined as comprising a tough, score and mar resistant surface and/or a density ranging from about 300 $kg/m^3$ to about 1,500 $kg/m^3$, more particularly from about 505 $kg/m^3$ to about 1250 $kg/m^3$, and most particularly from about 750 $kg/m^3$ to about 1100 $kg/m^3$.

According to a particular aspect of the present disclosure the synthetic closure has an overall density of from about 100 $kg/m^3$ to about 800 $kg/m^3$, in particular from about 150 $kg/m^3$ to about 500 $kg/m^3$, in particular from about 200 $kg/m^3$ to about 500 $kg/m^3$, in particular from about 220 $kg/m^3$ to about 400 $kg/m^3$, in particular from about 250 $kg/m^3$ to about 375 $kg/m^3$.

It has also been found that further additional additives may be incorporated into either the core member and/or the at least one peripheral layer of the synthetic closure according to the present disclosure in order to provide further enhancements and desirable performance characteristics. These additional additives incorporate antimicrobial agents, antibacterial compounds, and or oxygen scavenging materials. Suitable additives are known to the person skilled in the art. The antimicrobial and antibacterial additives can be incorporated into the closure to impart an additional degree of confidence that in the presence of a liquid the potential for microbial or bacterial growth is extremely remote. These additives have a long-term time release ability and further increase the shelf life without further treatments by those involved with the bottling of wine. Furthermore, it is possible for the cells of the closure to be substantially filled with a non-oxidizing gas, in order to further reduce oxygen ingress into the container. Ways of achieving this are known in the prior art.

As discussed herein, intimate bonded interengagement of the at least one peripheral layer to the core member is advantageous for providing a synthetic bottle closure capable of being used in the wine industry. In this regard, although it has been found that the methods detailed herein provide secure intimate bonded interengagement of the at least one peripheral layer to the core member, alternative layers or bonding chemicals can be employed, depending upon the particular materials used for forming the core member and the at least one peripheral layer.

If desired, bonding agents or tie layers known to the skilled person can be employed on the outer surface of the core member in order to provide secure intimate bonded interengagement of the at least one peripheral layer therewith. If a tie layer is employed, the tie layer would effectively be interposed between the core member and the at least one peripheral layer to provide intimate bonded interengagement by effectively bonding the peripheral layer and the core member to the intermediately positioned tie layer. However, regardless of which process or bonding procedure is employed, all of these alternate embodiments are within the scope of the present disclosure. If more than one peripheral layer is present, such bonding agents or tie layers can similarly be employed between respective peripheral layers.

In addition, the closures obtained by the method of the present disclosure may also comprise decorative indicia such as letters, symbols, colors, graphics, and wood tones printed on at least one peripheral layer and/or one of the substantially flat terminating surfaces forming the opposed ends of said closure or stopper. Printing of these indicia can be performed in-line, during production of the closure or in a separate step after the closure has been manufactured. Accordingly, the closure of the present disclosure may comprise a decorative effect on at least one of the peripheral layer and the substantially flat terminating surfaces forming the opposed ends of said closure or stopper.

The closure according to the present disclosure can further comprise a silicone layer on at least one of its surfaces, in particular on its peripheral surface. Such a layer can help for example with insertion of the closure into a container. If a silicone layer is present, this is particularly formed by extrusion and/or by tumbling.

By employing the materials disclosed herein as at least one further polymer or copolymer and forming the combined material in peripheral, surrounding, bonded engagement with any desired foamed core member, a highly effective, multi-layer closure is attained which is able to provide at least one, particularly more than one, particularly almost all or even all properties suitable for a wine bottle closure.

The closure according to the present disclosure advantageously has an oxygen transfer rate (OTR) in axial direction as determined by Mocon measurement according to ASTM F-1307 using 100% oxygen of from about 0.0001 cc/day/closure to about 0.1000 cc/day/closure, in particular from about 0.0005 cc/day/closure to about 0.050 cc/day/closure.

The present disclosure further relates to a method for producing a synthetic closure according to the present disclosure, said method comprising at least the steps of:

a. providing a core member composition comprising at least one thermoplastic polymer;

b. optionally combining the core member composition with cork powder to obtain a core member-cork powder composition;

c. providing at least one blowing agent to the core member composition or to the core member-cork powder composition to obtain a composition comprising at least one thermoplastic polymer and at least one blowing agent;

d. at least one of before, during and after method step c., heating the core member composition provided in method step a. or the core member-cork powder composition obtained in method step b. to obtain a heated composition;

e. extruding a continuous, elongated, substantially cylindrically shaped length of the heated composition obtained in method step d. to obtain, as core member, a continuous elongated length of thermoplastic polymer having a cylindrical surface;

f. optionally providing a peripheral layer composition comprising at least one thermoplastic polymer;

g. optionally combining the peripheral layer composition with cork powder to obtain a peripheral layer-cork powder composition;

h. optionally extruding a separate and independent peripheral layer of the composition provided in method step g. separately to, co-axially to and in intimate bonded engagement with the continuous, elongated length of thermoplastic polymer obtained in method step e., said separate and independent peripheral layer peripherally surrounding and substantially enveloping the cylindrical surface of the continuous, elongated length of thermoplastic polymer to obtain a multi-component elongated structure having a cylindrical surface;

i. cutting the continuous elongated length of thermoplastic polymer obtained in method step e. or the multi-component elongated structure obtained in method step h. in a plane substantially perpendicular to the central axis of said multi-component elongated structure to obtain a closure; and j. optionally printing, coating, or post-treating at least one of the continuous elongated length of thermoplastic polymer obtained in method step e., the multi-component structure obtained in method step h. and the closure obtained in method step i.

The details regarding the at least one thermoplastic polymer in the core member composition provided in method step a. are the same as the details for the thermoplastic polymers described herein for the core member of the closure of the present disclosure. If a combination of thermoplastic polymers is used, the composition provided in method step a. comprises this combination.

The details regarding the cork powder optionally provided in method step b. are the same as those disclosed in the present disclosure for cork powder. Before combining the cork powder in method step b. it is conceivable to carry out at least one step of treating the cork powder, in particular to remove all or substantially all haloanisoles, in particular TCA, but also optionally TBA, TeCA and/or PCA which may be present in the cork powder. Such a treatment step can be, for example, by means of washing, heating, steam heating, infrared heating, or microwave heating. Suitable treatments are known in principle to the skilled person. A treatment by washing can be effected, for example, by means of any suitable solvent, including, but not limited to, organic solvents such as hydrocarbons, aqueous fluids such as washing solutions or dispersions which are capable of removing TCA from cork powder, or supercritical fluids such as supercritical carbon dioxide. Environmentally friendly solvents which are also food-safe are preferred, such as aqueous fluids or supercritical fluids. During a washing step the cork powder can be suspended in the solvent, optionally agitated, and then the solvent removed by filtration or the like. A treatment step, in particular a washing step, can be repeated as many times as necessary to achieve an acceptable level of haloanisoles, particularly of chloroanisoles, particularly of TCA, but also optionally TBA, TeCA and/or PCA, in the cork powder. The amount of haloanisole released into wine can be measured as so-called "releasable haloanisole" by soaking a cork or a sample of corks in a wine for 24 hours for an untreated cork or 48 hours for a treated cork, and measuring the amount of each haloanisole compound in the wine, for example by means of chromatographic or spectroscopic methods such as gas chromatography or nuclear magnetic resonance spectroscopy. An acceptable level is generally considered to be one which results in an amount of the respective haloanisole, particularly of the respective chloroanisole or chloroanisoles in the wine which is below the average sensory threshold of about 6 ng/L for TCA or TBA, whereby TeCA and PCA have been reported to be respectively about three times and one thousand times less potent in their sensory thresholds.

According to a particular aspect of method step b. of the present disclosure a masterbatch of core member-cork powder composition can be prepared, for example in the form of pellets, or any other form suitable for subsequent extrusion to form a core member, in which cork powder is already compounded with a synthetic polymer. The compounding can take place by means of mixing, pultrusion, extrusion, or any other method known to the skilled person and appearing suitable. Method step b. can be carried out discontinuously with subsequent method steps, for example a masterbatch can be pre-prepared and optionally stored before further method steps. If a masterbatch is prepared, the masterbatch can also be envisioned to comprise further components. For example, one or more of a fatty acid, a fatty acid derivative, expandable microspheres and one or more blowing agents can conceivably be combined with the masterbatch components in method step b., i.e. at the same time as the cork combining. If one or more of expandable microspheres and at least one blowing agent are combined in method step b., care must be taken that the temperature to make the masterbatch, for example the extrusion temperature to make the masterbatch, is below the initiation temperature for the expandable microspheres and/or the blowing agent or agents. These initiation temperatures depend on the microspheres and blowing agents and are known or available to the skilled person. Alternatively, method step b. can be carried out continuously with subsequent method steps, in which case, for example, cork powder and a core member composition are combined and supplied continuously to subsequent method steps.

The details regarding the blowing agent provided in method step c. are the same as the details for the blowing agent described herein with respect to the closure of the present disclosure. Further additives can also be provided in method step c., such as, for example, at least one nucleating agent. Details regarding such additives are the same as the details regarding additives described herein with respect to the closure of the present disclosure. If a masterbatch is prepared in method step b. the blowing agent can be provided to the core member-cork powder composition in such a way that it is comprised in the masterbatch.

If a fatty acid or a fatty acid derivative should be present in the closure according to the disclosure, this is advantageously provided in one of method steps a. to c. Details regarding suitable fatty acids and fatty acid derivatives are the same as the details regarding suitable fatty acids and fatty acid derivatives described herein with respect to the closure of the present disclosure. If a masterbatch is prepared in method step b., a fatty acid or a fatty acid derivative is advantageously provided such that it is present in the masterbatch.

The heating in method step d. preferably occurs to a temperature at which the composition provided in method step a. or the composition obtained in method steps b. or c. are soft enough to enable foaming to the desired density and/or extrusion of the respective composition. If a blowing agent is used which requires heat to provide the blowing effect, the heating in method step d. preferably occurs to a temperature at which this blowing effect can occur. Suitable temperatures depend principally on the thermoplastic polymer and blowing agent selected and can be easily determined by the skilled person based on the known properties of the thermoplastic polymer and blowing agent and/or based on simple trials. In an aspect of the disclosed method where cork powder is comprised in the composition to be heated in method step d., the heating in method step d. particularly does not exceed a temperature of 170° C.

Method step e. can occur in any way known to the skilled person and appearing suitable, in particular using known extrusion equipment.

The details regarding the peripheral layer composition provided in method step f. are the same as the details regarding suitable materials, compounds and compositions described herein with respect to the at least one peripheral layer of the closure of the present disclosure.

The details regarding the cork powder optionally combined in method step g. are the same as those disclosed in the present disclosure for cork powder.

According to a particular aspect of method step g. of the present disclosure a masterbatch of peripheral layer-cork powder composition can be prepared, for example in the form of pellets, or any other form suitable for subsequent extrusion to form a peripheral layer, in which cork powder is already compounded with a synthetic polymer. The compounding can take place by means of mixing, pultrusion, extrusion, or any other method known to the skilled person and appearing suitable. Method step g. can be carried out discontinuously with subsequent method steps, for example a masterbatch can be pre-prepared and optionally stored before further method steps. Alternatively, method step g. can be carried out continuously with subsequent method steps, in which case, for example, cork powder and a peripheral layer composition are combined and supplied continuously to subsequent method steps.

Method step h. can occur in any way known to the skilled person and appearing suitable, in particular using known extrusion equipment.

According to an aspect of the method according to the present disclosure, method step h. occurs substantially simultaneously with method step e.

According to a further aspect of the method according to the present disclosure, method step h. occurs after method step e.

According to a further aspect of the method according to the present disclosure, method step h. can be repeated one or more times in order to obtain one or more further peripheral layers, whereby the one or more further peripheral layers are separately extruded in intimate bonded engagement with the cylindrical outer surface of the multi-component elongated structure to form a multilayer elongated length of material.

After the extrusion in method step e. and/or in method step h., the continuous elongated length of thermoplastic polymer or the multi-component elongated structure can be cooled by methods known to the skilled person. These include, for example, passing through a cooling bath, spraying, blowing and the like.

The cutting in method step i. and the optional printing, coating, or post-treating of method step j. can be carried out in any way known and appearing suitable to the skilled person. Post-treating can comprise, for example, surface treatments such as plasma treatment, corona treatment, or providing a lubricant to the surface of the closure. If the core member and/or the peripheral layer comprises cork powder, it may be desirable to use branding to impart an image or writing onto the cylindrical surface or one or both flat surfaces of the closure, for example using branding methods known for natural cork closures.

The method disclosed herein can further comprise a method step of maintaining an extrusion temperature in the range of from about 120° C. to about 170° C. The maintaining of an extrusion temperature in this range is particularly envisaged during extrusion of any composition comprising cork powder. In this way, for example, discoloration can be avoided. Should discoloration occur this can be at least partially corrected, for example by addition of colorants or other additives.

All details disclosed herein for the closures according to the present disclosure are also relevant for the method according to the present disclosure and therefore also form part of the disclosure of the method disclosed herein.

The present disclosure also relates to a closure produced according to a method as described herein.

The synthetic closure according to the present disclosure or produced according to a method according to the present disclosure advantageously has a surface roughness measured by contact profilometry in the range of from 3 μm to 17 μm, particularly in the range of from 3 μm to 16 μm, particularly in the range of from 3 μm to 15 μm, particularly in the range of from 3 μm to 14 μm, 13 μm, 12 μm, 11 μm or 10 μm, particularly in the range of from 4 μm to 10 μm, particularly in the range of from 4 μm to 9 μm. A surface roughness in this range is achievable because of the use of cork powder with small particle sizes, rather than the use of larger cork particles or cork granules.

In a particular aspect of the synthetic closure according to the present disclosure the cork powder has at least one, particularly both of the properties:
- a bulk density in the range of from 25 kg/m³ to 500 kg/m³, particularly in the range of from 40 kg/m³ to 450 kg/m³, particularly in the range of from 60 kg/m³ to 400 kg/m³, particularly in the range of from 80 kg/m³ to 380 kg/m³, particularly in the range of from 100 kg/m³ to 300 kg/m³;
- a humidity in the range of from about 0% to about 10%, particularly in the range of from about 0% to about 8%, particularly in the range of from about 0% to about 8%, particularly in the range of from about 0% to about 7%, particularly in the range of from about 0% to about 6%, more particularly in the range of from about 0% to about 5%, more particularly in the range of from about 0% to about 5%, more particularly in the range of from about 0% to about 4%, more particularly in the range of from about 0% to about 3%, more particularly in the range of from about 0% to about 2%, more particularly in the range of from about 0% to about 1%. A lower limit may be, for example, 0%, 0.1%, 0.2%, 0.4%, 0.5%, 0.6% or 0.7%.

These properties of the cork powder also apply to the cork powder used in the method according to the present disclosure.

The closure according to the present disclosure or produced according to the method of the present disclosure has advantageous properties making it particularly suitable for packaging and in particular for use as a closure for wine bottles. If the product is packaged under inert conditions, the closure advantageously has an oxygen ingress rate of less than about 1 mg oxygen per container in the first 100 days after closing the container, whereby the oxygen ingress rate is advantageously selected from the group consisting of less than about 0.5 mg oxygen, less than about 0.25 mg oxygen, less than about 0.2 mg oxygen and less than about 0.1 mg oxygen, per container in the first 100 days after closing the container. The closure according to the present disclosure or produced according to the method of the present disclosure achieves at least a comparable performance to known synthetic closures with respect to use as a closure for wine bottles, as measured by, for example, at least one of, particularly more than one of, particularly all of the properties of oxygen transfer rate, extraction force, and leakage. In addition, the closure according to the present disclosure or produced according to the method of the present disclosure has an appearance resembling that of natural cork and can in some aspects be branded in the same way as a natural cork closure.

Advantageously, the closure according to the present disclosure has an extraction force determined according to the herein described test method of not more than about 400 N, particularly of not more than about 390 N, particularly of not more than about 380 N, particularly of not more than about 370 N, particularly of not more than about 360 N, particularly of not more than about 350 N, particularly of not more than about 340 N, particularly of not more than about 330 N, more particularly of not more than about 320 N, more particularly of not more than about 310 N, more particularly of not more than about 300 N, whereby extraction forces in the range of from about 200 N to about 400 N, particularly in the range of from about 210 N to about 380 N, particularly in the range of from about 220 N to about 350 N, particularly in the range of from about 230 N to about 300 N are advantageously achieved. The extraction force describes the force needed to remove a closure from a container, in particular from a bottle, under standardized conditions. A lower extraction force relates to a greater ease of extraction of the closure. An extraction force in the range of from about 200 N to about 400 N is generally considered acceptable for a wine bottle closure. The presently disclosed closures thus achieve extraction force within the range considered acceptable for wine bottle closures.

According to a further aspect of the closure according to the present disclosure or the closure produced according to the method according to the present disclosure, the closure comprises the peripheral layer surrounding and intimately bonded to the cylindrical surface of the core member and the end surfaces of the core member are devoid of said layer.

The present disclosure also relates to a use of a closure as disclosed herein or produced according to a method described herein for sealing closed a container.

According to an aspect of the use disclosed herein, the closure has an oxygen ingress rate of less than about 1 mg oxygen per container in the first 100 days after closing the container.

According to this aspect of the use disclosed herein, the oxygen ingress rate is selected from the group consisting of less than about 0.5 mg oxygen, less than about 0.25 mg oxygen, less than about 0.2 mg oxygen and less than about 0.1 mg oxygen, per container in the first 100 days after closing the container.

According to the present disclosure, a closure can be realized which is capable of providing at least one, particularly more than one, particularly almost all or even all of the needs imposed thereupon by the wine industry, as well as any other bottle closure/packaging industry. As a result, a synthetic bottle closure can be attained that can be employed for completely sealing and closing a desired bottle for securely and safely storing the product retained therein, optionally with desired markings and/or indicia printed thereon. The disclosure herein concerning the closures of the present disclosure also applies to the closures prepared by the presently disclosed method. The disclosure herein concerning the closures prepared by the presently disclosed method also applies to the closures of the present disclosure.

The present disclosure accordingly comprises an article of manufacture possessing the features, properties, and relation of elements which will be exemplified in the article herein described, and the scope of the present disclosure will be indicated in the claims.

BRIEF DESCRIPTION OF THE DRAWINGS

For a fuller understanding of the nature and objects of the present disclosure herein described, reference should be had to the following detailed description taken in connection with the accompanying drawings, in which.

DETAILED DESCRIPTION

By referring to the FIGURES, along with the following detailed disclosure, the construction and production method for the synthetic closures of the present disclosure can best be understood. In these Figures, as well as in the detailed disclosure herein, the synthetic closure of the present disclosure, and its method of production, is depicted and discussed as a bottle closure for wine products. However, as detailed herein, the present disclosure is applicable as a synthetic closure for use in sealing and retaining any desired product in any desired closure system. However, due to the stringent and difficult demands placed upon closures for wine products, the detailed disclosure herein focuses upon the applicability of the synthetic bottle closures of the present disclosure as a closure for wine bottles. However, it is to be understood that this detailed discussion is provided merely for exemplary purposes and is not intended to limit the present disclosure to this particular application and embodiment.

Figure 1:
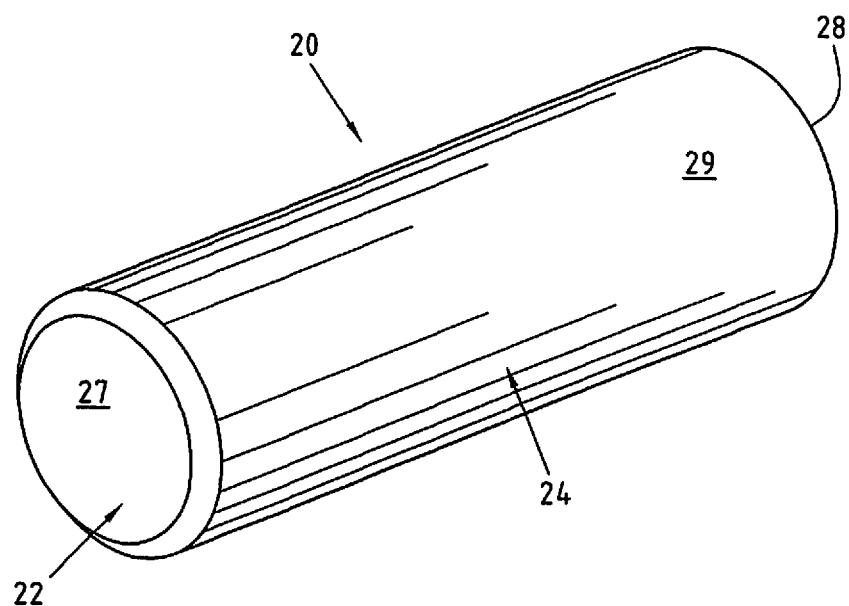
FIG. 1 is a perspective view of a synthetic closure according to an aspect of the present disclosure.
Figure 2:
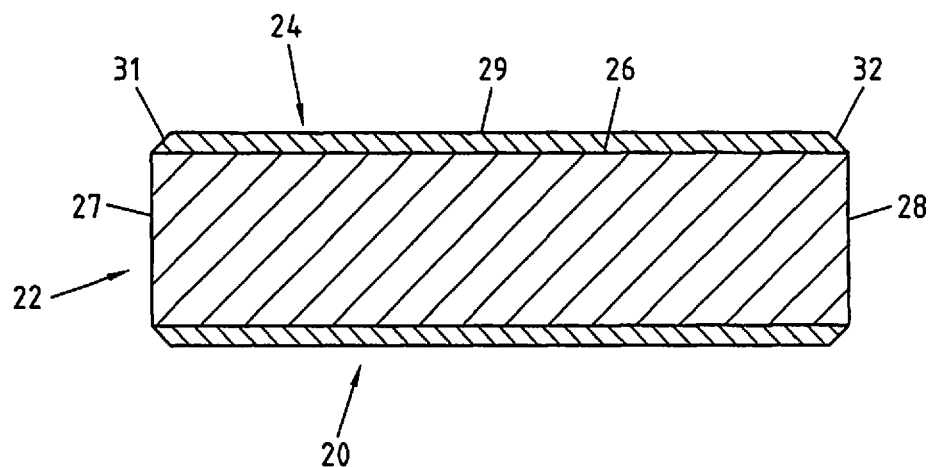
FIG. 2 is a cross sectional-side elevation of a synthetic closure according to an aspect of the present disclosure.

In FIGS. 1 and 2, the exemplary construction of a synthetic closure 20 is depicted comprising a generally cylindrical shape formed by core member 22 and peripheral layer 24 which peripherally surrounds and is intimately bonded to core member 22. In the exemplary aspect, core member 22 comprises a substantially cylindrically shaped surface 26, terminating with substantially flat end surfaces 27 and 28. Whenever applicable, the following detailed description of a synthetic closure having a layered structure, i.e. a core member and a peripheral layer, shall also apply to multilayer closures having more than one peripheral layer.

In an exemplary aspect, peripheral layer 24 is intimately bonded directly to core member 22, peripherally surrounding and enveloping surface 26 of core member 22. Peripheral layer 24 incorporates exposed surface 29, which comprises a substantially cylindrical shape and forms the outer surface of synthetic bottle closure 20 of the present disclosure, along with surfaces 27 and 28 of the substantially flat terminating ends.

In order to assist in assuring entry of synthetic bottle closure 20 into the portal of the bottle into which closure 20 is inserted, terminating edge 31 of peripheral layer 24 may be beveled or chamfered. Similarly, terminating edge 32 of peripheral layer 24 also may comprise a similar bevel or chamfer. Although any desired bevel or chamfered configuration can be employed, such as a radius, curve, or flat surface, it has been found that by merely cutting ends 31 and 32 with an angle of about 45° or about 60° the desired reduced diameter area is provided for achieving the desired effect. The chamfer angle and the chamfer length, i.e. the length of the chamfered surface as measured between surface 26, or surface 29 if a peripheral layer is comprised, are exemplarily within the ranges described herein for still wine closures or champagne closures.

By incorporating chamfered or beveled ends 31 and 32 on synthetic bottle closure 20, automatic self-centering is attained. As a result, when synthetic bottle closure 20 is compressed and ejected from the compression jaws into the open bottle for forming the closure thereof, synthetic bottle closure 20 is automatically guided into the bottle opening, even if the clamping jaws are slightly misaligned with the portal of the bottle. By employing this configuration, unwanted difficulties in inserting bottle closure 20 into any desired bottle are obviated. However, in applications which employ alternate stopper insertion techniques, chamfering of ends 31 and 32 may not be needed. Further, in order to facilitate the insertion of the closure into the bottle neck, the outer surface can fully or partly be coated with suitable lubricants, in particular with silicones. Coating with lubricants such as silicones can be carried out by a variety of techniques known in the art, including tumbling and/or extrusion coating. For closures for champagne or sparkling wine, a crosslinkable silicone is advantageously used since silicone can act as an antifoaming agent.

In order to produce the attributes suitable for use in the wine industry, core 22 is formed from foam plastic material as described herein using a continuous extrusion process. Although other prior art systems have employed molded foamed plastic material, these processes have proven to be more costly and incapable of providing a final product with the attributes of the present disclosure.

In order to demonstrate the efficacy of the present disclosure, samples of synthetic bottle closures 20, manufactured in accordance with the present disclosure and having a foamed core member, or a foamed core member and a solid peripheral layer, were produced and tested.

Test Methods

The Mocon test for OTR/oxygen ingress rate was carried out according to ASTM F-1307. The test for extraction force was carried out on a random sample selection according to the methods described in WO 03/018304 A1 (extraction test, p. 48, l. 13-p. 49, l. 10), which are herewith incorporated and form part of the present disclosure.

Extraction Force

Three empty, clean "Bordeaux" style wine bottles were stoppered using a semi-automatic corking machine (Model 4040 from GAI S.p.A., Italy). The bottles were stored for one hour. The closures were then extracted at ambient temperature using a Dillon AFG-1000N force gauge (from Dillon/Quality Plus, Inc., USA) to measure the force required for extraction.

Surface Roughness

The surface roughness was determined using a contact profilometer (Manufacturer: Time Group Inc., Model: TR100 Surface Roughness Tester).

Example 1—Monoextruded Closure Having a Core Member

The sample products were produced on conventional extrusion equipment. Core member 22 was produced by employing a mixture of 68 wt. % of a styrene ethylene butadiene styrene (SEBS) block copolymer (Lifoflex® UVE652162 from Müller Kunststoff GmbH, Germany), 30 wt. % of a SEBS/cork blend with 25 wt. % cork (dried Lifocork® from Müller Kunststoff GmbH, Germany) using 2 wt. % expandable microspheres (Expancel® 909 DU 80 from AkzoNobel, United States) as blowing agent. All weight percent amounts are based on the total weight of the mixture. The components were dry blended and fed into the extruder. The degree of foaming was adjusted so as to produce samples having a density of 450 kg/m$^3$. The components were combined in a 1 inch single screw extruder at temperatures between 140° C. and 150° C. and extruded at a die temperature of 130° C. The resulting extrudate was air-cooled to about 25° C. and cut into lengths suitable for forming bottle closure 20, followed by a chamfer being formed in edges 31 and 32. The surface roughness measured by contact profilometry was 6.9 µm.

Example 2—Coextruded Closure Having a Core Member and a Peripheral Layer

The sample products were produced on conventional co-extrusion equipment. Core member 22 was produced by employing low density polyethylene (LDPE) using an inert gas as physical blowing agent. The degree of foaming was adjusted so as to produce samples having a foam density of 261 kg/m$^3$. In forming peripheral layer 24, the following mixtures were used, whereby the amounts are given in wt. % based on the total weight of the peripheral layer composition:

| Component | Closure 1 | Closure 2 | Closure 3 |
|---|---|---|---|
| TPV* | 79.0 | — | — |
| SEBS* | — | 79.0 | 58.0 |
| TPV/cork powder 50/50 blend# | 20.0 | 20.0 | 40.0 |
| Colorant | 1.0 | 1.0 | 2.0 |

*TPV: thermoplastic vulcanisate [Sarlink NC from Teknor Apex company with a hardness level of 65 Shore A]; SEBS: styrene ethylene butadiene styrene block copolymer (Maxelast ® D01-048E from Nantong Polymax Elastomer Technology Co., Ltd).
the TPV/cork blend was made from compounding together cork powder as described herein with TPV [Sarlink NC from Teknor Apex company with a hardness level of 65 Shore A] in the given amounts.

The components of the peripheral layer were dry blended with each other and fed to the extrusion equipment. In the forming process, peripheral layer 24 was formed in the extrusion equipment peripherally surrounding core member 22 and being intimately bonded thereto. The peripheral layer thickness was 0.4 mm. The resulting products were cut into lengths suitable for forming bottle closure 20, followed by a chamfer being formed in edges 31 and 32. The closures had surface roughness measures by contact profilometry and 1 hour extraction force measured as described herein for a 44 mm long closure as shown in Table 2. Surface roughnesses and extraction forces are shown for comparison closures 4 (natural cork), 5 (agglomerated cork) and 6 (micro-agglomerated cork). A natural cork is a single, solid piece of cork cut from the bark of a cork oak. Both agglomerated and microagglomerated closures consist of cork particles bound together by an adhesive; microagglomerated closures are made from smaller cork particle sizes (0.5-2 mm) as compared to agglomerated closures (3 to 7 mm).

| Closure | Surface roughness, μm | 1 hour extraction force, N |
|---|---|---|
| 1 | 8.4 | 245 |
| 2 | 5.4 | 285 |
| 3 | 8.9 | 295 |
| 4 | 8.6 | 200 (45 mm long) |
| 5 | 8.7 | 250 (43 mm long) |
| 6 | 11.3 | 265 (44 mm long) |

It can thus be seen that the closures prepared according to the present disclosure have comparable or even better properties than natural corks, agglomerated corks and micro-agglomerated corks.

It will thus be seen that the needs set forth above, among those made apparent from the preceding description, are efficiently obtained and, since certain changes may be made in carrying out the above method without departing from the scope of this disclosure, it is intended that all matter contained in the above description or shown in the accompanying drawings shall be interpreted as illustrative and not in a limiting sense. Furthermore, it should be understood that the details of the disclosure described in the foregoing detailed description are not limited to the specific embodiments shown in the drawings but are rather meant to apply to the present disclosure in general as outlined in the summary of the present disclosure and in the claims.

It is also to be understood that the following claims are intended to cover all of the generic and specific features of the present disclosure herein described, and all statements of the scope of the present disclosure which, as a matter of language, might be said to fall there between.

What is claimed is:

1. A synthetic closure for a product-retaining container constructed for being inserted and securely retained in a portal-forming neck of said container, said closure comprising:
   a. a core member comprising at least one low density thermoplastic polymer having an unfoamed density in a range of from 0.7 g/cm$^3$ to 1.5 g/cm$^3$, and
   b. at least one peripheral layer at least partially surrounding and intimately bonded to at least one surface of the core member, said peripheral layer comprising at least one thermoplastic polymer, wherein
   the synthetic closure is formed by extrusion,
   at least one of the core member and the at least one peripheral layer comprises a plurality of cells, and the synthetic closure comprises cork powder.

2. The closure according to claim 1, wherein the cork powder is comprised in the at least one of the core member and the at least one peripheral layer.

3. The closure according to claim 1, wherein the cork powder is present in the core member and in the at least one peripheral layer.

4. The closure according to claim 1, wherein the cork powder is present in the core member.

5. The closure according to claim 1, wherein the cork powder is present in the peripheral layer.

6. The closure according to claim 1, wherein the cork powder is comprised in an amount in the range of from 0.5 wt. % to 75 wt. %, based on the total weight of the synthetic closure.

7. The closure according to claim 5, wherein the cork powder is comprised in an amount in the range of from 0.5 wt. % to 15 wt. %, based on a total weight of the synthetic closure.

8. The closure according to claim 1, wherein the cork powder comprises particles having a particle size measured according to ISO 2030:1990, in a range of from 1 μm to 2000 μm.

9. The closure according to claim 1, wherein the synthetic closure is produced by a process comprising at least a process step of coextrusion.

10. The closure according to claim 1, wherein the synthetic closure is produced by a process comprising at least a process step of maintaining an extrusion temperature in a range of from about 120° C. to about 170° C.

11. The closure according to claim 1, wherein at least one of a size and a distribution of the plurality of cells in the core member is substantially uniform throughout at least one of a length and a diameter of the core member.

12. The closure according to claim 1, wherein the plurality of cells is a plurality of substantially closed cells.

13. The closure according to claim 1, wherein the plurality of cells comprises a cell size in a range of from about 0.025 mm to about 0.5 mm.

14. The closure according to claim 1, wherein the core member comprises at least one of closed cells having an average cell size ranging from about 0.02 mm to about 0.50 mm and a cell density ranging from about 8,000 cells/cm$^3$ to about 25,000,000 cells/cm$^3$.

15. The closure according to claim 1, wherein said closure has a substantially cylindrical shape comprising substantially flat terminating surfaces forming opposed ends of said closure and the substantially flat terminating surfaces of the core member are substantially devoid of the at least one peripheral layer.

16. The closure according to claim 1, wherein the core member comprises at least one thermoplastic polymer selected from the group consisting of polyethylenes, metallocene catalyst polyethylenes, polybutanes, polybutylenes, polyurethanes, silicones, vinyl-based resins, thermoplastic elastomers, polyesters, ethylenic acrylic copolymers, ethylene-vinyl-acetate copolymers, ethylene-methyl-acrylate copolymers, thermoplastic polyurethanes, thermoplastic olefins, thermoplastic vulcanizates, flexible polyolefins, fluorelastomers, fluoropolymers, polytetrafluoroethylenes, and blends thereof, ethylene-butyl-acrylate copolymers, ethylene-propylene-rubber, styrene butadiene rubber, styrene butadiene block copolymers, ethylene-ethyl-acrylic copolymers, ionomers, polypropylenes, and copolymers of polypropylene and copolymerizable ethylenically unsaturated comonomers, olefin copolymers, olefin block copolymers and mixtures thereof.

17. The closure according to claim 1, wherein the peripheral layer comprises at least one thermoplastic polymer selected from the group consisting of polyethylenes, metallocene catalyst polyethylenes, polybutanes, polybutylenes, polyurethanes, silicones, vinyl-based resins, thermoplastic elastomers, polyesters, ethylenic acrylic copolymers, ethylene-vinyl-acetate copolymers, ethylene-methyl-acrylate copolymers, thermoplastic polyurethanes, thermoplastic olefins, thermoplastic vulcanizates, flexible polyolefins, fluorelastomers, fluoropolymers, polytetrafluoroethylenes, and blends thereof, ethylene-butyl-acrylate copolymers, ethylene-propylene-rubber, styrene butadiene rubber, styrene butadiene block copolymers, ethylene-ethyl-acrylic copolymers, ionomers, polypropylenes, and copolymers of polypropylene and copolymerizable ethylenically unsaturated comonomers, olefin copolymers, olefin block copolymers, styrene ethylene butadiene styrene block copolymers, styrene ethylene butylene styrene block copolymers, styrene ethylene butylene block copolymers, styrene butadiene styrene block copolymers, styrene butadiene block copolymers, styrene isoprene styrene block copolymers, styrene isobutylene block copolymers, styrene isoprene block copolymers, styrene ethylene propylene styrene block copolymers, styrene ethylene propylene block copolymers and combinations of two or more thereof.

18. The closure according to claim 1 having an overall density of from about 100 kg/m$^3$ to about 800 kg/m$^3$.

19. The closure according to claim 1, wherein said core member and said at least one peripheral layer are extruded substantially simultaneously or said core member is extruded separately and subsequent thereto said at least one peripheral layer is formed in extrusion equipment peripherally surrounding and enveloping a pre-formed core member.

20. A method for producing a synthetic closure according to claim 1, said method comprising the steps of:
   a. providing a core member composition comprising at least one thermoplastic polymer;
   b. combining the core member composition with cork powder to obtain a core member—cork powder composition;
   c. providing at least one blowing agent to the core member composition or to the core member—cork powder composition to obtain a composition comprising at least one thermoplastic polymer and at least one blowing agent;
   d. at least one of before, during and after method step c., heating the core member composition provided in method step a. or the core member—cork powder composition obtained in method step b. to obtain a heated composition;
   e. extruding a continuous, elongated, substantially cylindrically shaped length of the heated composition obtained in method step d. to obtain, as core member, a continuous, elongated length of thermoplastic polymer having a cylindrical surface;
   f. providing a peripheral layer composition comprising at least one thermoplastic polymer;
   g. combining the peripheral layer composition with cork powder to obtain a peripheral layer—cork powder composition;
   h. extruding a separate and independent peripheral layer of the composition provided in method step g. separately to, co-axially to and in intimate bonded engagement with the continuous, elongated length of thermoplastic polymer obtained in method step e., said separate and independent peripheral layer peripherally surrounding and substantially enveloping the cylindrical surface of the continuous, elongated length of thermoplastic polymer to obtain a multi-component elongated structure having a cylindrical surface;
   i. cutting the continuous, elongated length of thermoplastic polymer obtained in method step e. or the multi-component elongated structure obtained in method step h. in a plane substantially perpendicular to a central axis of said multi-component elongated structure to obtain a closure; and
   j. printing, coating, or post-treating at least one of the continuous elongated length of thermoplastic polymer obtained in method step e., the multi-component structure obtained in method step h., and the closure obtained in method step i.

21. The method according to claim 20, further comprising maintaining an extrusion temperature in the range of from about 120° C. to about 170° C.

22. A closure produced according to a method comprising:
   a. providing a core member composition comprising at least one low density thermoplastic polymer having an unfoamed density in a range of from 0.7 g/cm$^3$ to 1.5 g/cm$^3$;
   b. combining the core member composition with cork powder to obtain a core member—cork powder composition;
   c. providing at least one blowing agent to the core member composition or to the core member—cork powder composition to obtain a composition comprising the at least one low density thermoplastic polymer and the at least one blowing agent;
   d. heating one of the core member composition or the core member—cork powder composition to obtain a heated composition;
   e. extruding a continuous, elongated, substantially cylindrically shaped length of the heated composition to obtain, as a core member, a continuous, elongated length of thermoplastic polymer having a cylindrical surface;
   f. providing a peripheral layer composition comprising at least one thermoplastic polymer;
   g. combining the peripheral layer composition with cork powder to obtain a peripheral layer—cork powder composition;
   h. extruding a separate and independent peripheral layer of the peripheral layer—cork powder composition separately to, co-axially to and in intimate bonded engagement with the continuous, elongated length of thermoplastic polymer, said separate and independent peripheral layer peripherally surrounding and substantially enveloping the cylindrical surface of the continuous, elongated length of thermoplastic polymer to obtain a multi-component elongated structure having a cylindrical surface;
  i. cutting the continuous, elongated length of thermoplastic polymer or the multi-component elongated structure in a plane substantially perpendicular to a central axis of said multi-component elongated structure to obtain a closure; and
  j. printing, coating, or post-treating at least one of the continuous elongated length of thermoplastic polymer, the multi-component elongated structure and the closure.

23. The synthetic closure according to claim 1, having a surface roughness measured by contact profilometry in a range of from 3 μm to 17 μm.

24. The synthetic closure according to claim 1, wherein the cork powder has at least one of the properties:
  a bulk density in a range of from 25 kg/m$^3$ to 500 kg/m$^3$;
  a humidity in a range of from 0% to 10%.

25. Use of the closure according to claim 1 for sealing closed a container.

26. Use according to claim 25, wherein said closure has an oxygen ingress rate of less than about 1 mg oxygen per container in the first 100 days after closing the container.

27. Use according to claim 26, wherein the oxygen ingress rate is selected from the group consisting of less than about 0.5 mg oxygen, less than about 0.25 mg oxygen, less than about 0.2 mg oxygen, and less than about 0.1 mg oxygen, per container in the first 100 days after closing the container.

* * * * *